US012590732B2

(12) United States Patent
Godes

(10) Patent No.: US 12,590,732 B2
(45) Date of Patent: Mar. 31, 2026

(54) HEATING SYSTEM AND METHODS

(71) Applicant: Brillouin Energy Corp., Emeryville, CA (US)

(72) Inventor: Robert E. Godes, Berkeley, CA (US)

(73) Assignee: Brillouin Energy Corp., Emeryville, CA (US)

( * ) Notice: Subject to any disclaimer, the term of this patent is extended or adjusted under 35 U.S.C. 154(b) by 0 days.

(21) Appl. No.: 19/073,990

(22) Filed: Mar. 7, 2025

(65) Prior Publication Data

US 2025/0369653 A1 Dec. 4, 2025

Related U.S. Application Data

(60) Provisional application No. 63/652,279, filed on May 28, 2024.

(51) Int. Cl.

| | |
|---|---|
| ***F24H 15/37*** | (2022.01) |
| ***F24H 9/20*** | (2022.01) |
| ***F24H 15/414*** | (2022.01) |
| ***H05B 1/02*** | (2006.01) |
| ***H05B 3/46*** | (2006.01) |

(52) U.S. Cl.

CPC ............... *F24H 15/37* (2022.01); *F24H 9/20* (2013.01); *F24H 15/414* (2022.01); *H05B 1/0297* (2013.01); *H05B 3/46* (2013.01); *F24H 2250/02* (2013.01); *H05B 2203/035* (2013.01)

(58) Field of Classification Search

None

See application file for complete search history.

(56) References Cited

U.S. PATENT DOCUMENTS 1,027,970 A * 5/1912 Allen ...................... F24H 1/102 165/154
1,110,919 A * 9/1914 Gamble .................. F24H 1/102 604/114

(Continued)

FOREIGN PATENT DOCUMENTS

CA 2900627 A1 10/2014
CN 1049930 A 3/1991

(Continued)

OTHER PUBLICATIONS

"New Energy Times; The Leader in News and Information on Low Energy Nuclear Reactions", Issue 21, Available online at: http://newenergytimes.com/news/2007/NET21.htm,, Mar. 17, 2007, 34 pages.

(Continued)

*Primary Examiner* — Thor S Campbell
(74) *Attorney, Agent, or Firm* — Smith Baluch LLP

(57) ABSTRACT

A heating system and related methods are described. The heating system employs one or more catalytic tubes, each having a reactive transmission line. Each catalytic tube is supported in a corresponding containment tube of a heater to produce heat. Heat can be generated by applying electrical pulses to the transmission lines which are exposed to a reactant flowing in the containment tube containing the catalytic tube. The generated heat can be extracted from the heater with a heat-transfer liquid or gas for various practical applications including, but not limited to, industrial, commercial, and residential heating applications.

30 Claims, 11 Drawing Sheets

(56) References Cited

U.S. PATENT DOCUMENTS 1,213,470 A * 1/1917 Finlay .................. F23C 13/00 431/328
1,355,838 A * 10/1920 McLean .................. F24H 1/102 392/479
1,671,677 A * 5/1928 Keeton .................. F24H 1/142 392/489
2,589,566 A * 3/1952 Neth .................. F24D 3/00 122/13.3
2,597,744 A * 5/1952 Morrison .................. F25D 31/002 165/104.19
2,637,199 A * 5/1953 Allander .................. G01N 25/62 73/335.06
2,813,964 A * 11/1957 Cerulli .................. F24H 1/102 392/489
3,122,014 A * 2/1964 Dobbins .................. G01N 30/30 73/23.35
3,584,194 A * 6/1971 Kautz .................. B05B 9/002 392/494
3,597,588 A * 8/1971 Kirschner .................. F24H 9/0021 392/452
3,607,131 A * 9/1971 Williams .................. B01D 53/34 423/240 R
3,688,083 A * 8/1972 Rice .................. F24H 1/0045 338/223
3,796,207 A * 3/1974 Olson .................. F02N 19/10 123/142.5 R
3,846,616 A * 11/1974 Beck .................. H05B 3/50 392/491
3,911,896 A * 10/1975 Charboneau .................. F24H 9/1836 431/170
4,129,491 A 12/1978 Obiaya
4,180,723 A * 12/1979 Szupillo .................. H05B 3/08 219/541
4,406,943 A * 9/1983 Wilkinson .................. H05B 3/46 239/431
4,641,012 A * 2/1987 Roberts .................. A47J 31/56 392/467
4,871,813 A 10/1989 Senez
4,894,584 A 1/1990 Steinmann et al.
4,961,880 A 10/1990 Barker
4,986,887 A 1/1991 Gupta et al.
5,018,180 A 5/1991 Shoulders
5,054,046 A 10/1991 Shoulders
5,054,047 A 10/1991 Shoulders
5,076,971 A 12/1991 Barker
5,123,039 A 6/1992 Shoulders
5,148,461 A 9/1992 Shoulders
5,160,695 A 11/1992 Bussard
5,216,743 A * 6/1993 Seitz .................. F24H 15/128 73/204.16
5,225,581 A 7/1993 Pintauro
5,318,675 A 6/1994 Patterson
5,411,654 A 5/1995 Ahern et al.
5,423,967 A 6/1995 Kunimatsu et al.
5,494,559 A 2/1996 Patterson
5,600,752 A * 2/1997 Lopatinsky .................. F24H 3/0405 138/33
5,607,691 A 3/1997 Hale et al.
6,024,935 A 2/2000 Mills et al.
6,080,971 A * 6/2000 Seitz .................. G05D 23/1935 219/486
6,169,850 B1 * 1/2001 Menassa .................. F24H 15/37 392/350
6,246,831 B1 * 6/2001 Seitz .................. F24H 15/174 219/483
6,248,221 B1 6/2001 Davis et al.
6,463,925 B2 * 10/2002 Nuckols .................. F23C 13/00 126/208
6,753,469 B1 6/2004 Kolawa et al.
6,983,105 B1 * 1/2006 Greene .................. F28D 7/106 165/157
7,041,203 B2 5/2006 Sullivan
7,081,602 B1 * 7/2006 Black .................. H05B 3/46 219/548
7,085,483 B2 * 8/2006 Terashima .................. F28D 20/028 392/311
7,584,789 B2 9/2009 Mo et al.
7,893,414 B2 2/2011 Larsen et al.
7,920,779 B2 * 4/2011 Shirai .................. E03D 9/08 392/491
8,227,020 B1 7/2012 Miley
8,346,069 B2 * 1/2013 Yeung .................. F24H 15/238 392/494
8,440,165 B2 5/2013 Miley et al.
8,485,791 B2 7/2013 Cravens
8,508,057 B2 8/2013 Schulte
8,559,800 B2 * 10/2013 Ellis .................. F16L 53/37 392/479
8,567,299 B2 10/2013 Kokot, Jr. et al.
8,603,405 B2 12/2013 Miley et al.
8,624,636 B2 1/2014 Godes
8,801,977 B2 8/2014 Cravens
9,115,913 B1 8/2015 Rossi
9,182,365 B2 11/2015 Kidwell
9,192,918 B2 11/2015 Kidwell
9,410,721 B2 8/2016 Cravens
9,540,960 B2 1/2017 Chauvin
10,453,575 B1 10/2019 Wong
10,753,275 B2 8/2020 Mills
11,049,621 B2 6/2021 Wong
2001/0019594 A1 9/2001 Swartz
2002/0186969 A1 * 12/2002 Henry .................. F24H 1/142 165/154
2003/0007790 A1 * 1/2003 Harris .................. F24H 7/0433 392/479
2003/0053579 A1 3/2003 Waisman et al.
2004/0023516 A1 2/2004 Londergan et al.
2005/0202173 A1 9/2005 Mills
2006/0153752 A1 7/2006 Arata
2006/0289463 A1 * 12/2006 Kil .................. H05B 3/56 219/505
2007/0086759 A1 * 4/2007 Russegger .................. B29C 45/2737 392/473
2007/0206715 A1 9/2007 Godes
2007/0286324 A1 12/2007 Hagelstein
2008/0089460 A1 4/2008 Sved
2008/0089676 A1 * 4/2008 Schubert .................. F28D 7/026 165/177
2008/0217324 A1 * 9/2008 Abbott .................. H05B 3/16 392/360
2009/0022256 A1 1/2009 Fitzgerald
2009/0135982 A1 5/2009 Groves
2009/0196801 A1 8/2009 Mills
2010/0175637 A1 7/2010 Moller et al.
2010/0206415 A1 8/2010 Ellis et al.
2011/0005506 A1 1/2011 Rossi
2011/0122984 A1 5/2011 Godes
2011/0123404 A1 * 5/2011 Rizzi .................. C01C 1/0482 219/539
2011/0194845 A1 * 8/2011 Wang .................. F24H 1/142 392/468
2011/0194846 A1 * 8/2011 Wang .................. B82Y 30/00 392/482
2011/0249783 A1 10/2011 Piantelli
2011/0255645 A1 10/2011 Zawodny
2012/0006408 A1 1/2012 El-Ghoroury et al.
2012/0141100 A1 * 6/2012 Evans .................. H05B 3/42 392/485
2013/0056210 A1 3/2013 Vinegar et al.
2013/0294757 A1 * 11/2013 Westmeier .................. F16L 53/38 392/468
2014/0332087 A1 11/2014 Godes et al.
2015/0162104 A1 6/2015 Soininen
2015/0187444 A1 7/2015 Godes
2015/0264747 A1 * 9/2015 Abbott .................. F24D 13/02 392/407
2015/0371723 A1 12/2015 Godes et al.
2019/0122773 A1 4/2019 Godes et al.
2019/0122774 A1 4/2019 Godes
2019/0358602 A1 11/2019 Tames

(56) References Cited

U.S. PATENT DOCUMENTS

| | | | | |
|---|---|---|---|---|
| 2020/0270416 | A1 | 8/2020 | Liao et al. | |
| 2020/0277209 | A1* | 9/2020 | Fraser | C02F 5/02 |
| 2020/0403555 | A1 | 12/2020 | Mills | |
| 2021/0371389 | A1 | 12/2021 | Santra | |
| 2022/0084693 | A1 | 3/2022 | Dodaro et al. | |
| 2022/0208399 | A1 | 6/2022 | Godes et al. | |
| 2022/0259056 | A1 | 8/2022 | Mortensen et al. | |
| 2022/0333302 | A1 | 10/2022 | Rowlands et al. | |
| 2023/0072686 | A1 | 3/2023 | Godes | |
| 2023/0158464 | A1 | 5/2023 | Carr et al. | |
| 2023/0358156 | A1* | 11/2023 | Grace | F01N 3/2839 |
| 2024/0041100 | A1* | 2/2024 | Park | A24D 1/20 |
| 2024/0367134 | A1* | 11/2024 | Hansen | H05B 3/42 |

FOREIGN PATENT DOCUMENTS

| | | | |
|---|---|---|---|
| CN | 1416946 | A | 5/2003 |
| CN | 101395677 | A | 3/2009 |
| CN | 101395677 | B | 3/2009 |
| CN | 101553076 | A | 10/2009 |
| CN | 102217001 | A | 10/2011 |
| CN | 102737733 | A | 10/2012 |
| CN | 105074834 | A | 11/2015 |
| CN | 107742539 | A | 2/2018 |
| CN | 110358623 | A | 10/2019 |
| EP | 0645777 | A1 | 3/1995 |
| EP | 1202290 | A2 | 5/2002 |
| EP | 1551032 | A1 | 7/2005 |
| EP | 1971985 | A2 | 9/2008 |
| EP | 1971985 | A4 | 9/2008 |
| EP | 1971985 | B1 | 9/2008 |
| EP | 2962308 | A2 | 1/2016 |
| EP | 3425638 | A2 | 1/2019 |
| FR | 2708779 | A1 | 2/1995 |
| GB | 2283361 | A | 5/1995 |
| HK | 1132580 | A1 | 3/2013 |
| HK | 1219346 | A1 | 3/2017 |
| JP | H03138598 | A | 6/1991 |
| JP | 2002094161 | A | 3/2002 |
| JP | 2002512377 | A | 4/2002 |
| JP | 2004085519 | A | 3/2004 |
| JP | 2004155628 | A | 6/2004 |
| JP | 2009522555 | A | 6/2009 |
| JP | 2012510050 | A | 4/2012 |
| JP | 2016516158 | A | 6/2016 |
| JP | 6704958 | B2 | 5/2020 |
| KR | 20150122227 | A | 10/2015 |
| KR | 102230117 | B1 | 3/2021 |
| WO | 9010935 | A1 | 9/1990 |
| WO | 9013127 | A1 | 11/1990 |
| WO | 9013129 | A2 | 11/1990 |
| WO | 9642085 | A2 | 12/1996 |
| WO | 199720967 | A1 | 6/1997 |
| WO | 03066516 | A2 | 8/2003 |
| WO | 2004007820 | A1 | 1/2004 |
| WO | 2004034406 | A1 | 4/2004 |
| WO | 2004044923 | A2 | 5/2004 |
| WO | 2007130156 | A2 | 11/2007 |
| WO | 2007130156 | A3 | 11/2007 |
| WO | 2008134451 | A1 | 11/2008 |
| WO | 2014172012 | A2 | 10/2014 |
| WO | 2014172012 | A3 | 10/2014 |
| WO | 2024250033 | A2 | 12/2024 |

OTHER PUBLICATIONS

"Physicist: Utah Cold-Fusion Gear Doesn't Work", The Washington Post, Mar. 29, 1990, 1 page.

"The NIH Guide to Molecular Modeling Molecular Mechanics," downloaded from http://cmm.info.nih.gov/modeling/guide_documents/molecular_mechanics_document.html#nonbond_ anchor, 9 pages.

Afonichev, et al. "Indicator of the process of cold fusion." International journal of hydrogen energy 28.9 (2003): 1005-1010.

Albagli et al., Measurement and Analysis of Neutron and Gamma-ray Emission Rates, other Fusion Products, and Power in Electrochemical Cells Having Pd Cathodes, Journal of Fusion Energy, vol. 9, No. 2, Jun. 1990, pp. 133-148.

Alber et al., Search for neutrons from 'cold nuclear fusion, Z. Phys. A.—Atomic Nuclei, vol. 333, No. 3, 1989, pp. 319-320.

Aleksan, et al. "Limits on electrochemically induced fusion of deuterium by neutron flux measurements." Physics Letters B 234.3 (1990): 389-394.

Anderson , "Einstein's Lost Hypothesis", Waste-Nautilus, Issue 7, Available Online at https://nautil.us/issue/7/waste/einsteins-lost-hypothesis, Nov. 28, 2013, 8 pages.

Anderson, et al. "The structure of the y phase of palladium deuteride." Physics Letters A 68.2 (1978): 249-251.

Antanasijevic, et al. "Preliminary observations on possible implications of new Bohr orbits (resulting from electromagnetic spin-spin and spin-orbit coupling) in "cold" quantum mechanical fusion processes appearing in strong "plasma focus" and "capillary fusion" experiments." Physics Letters A 180.1-2 (1993): 25-32.

Arzhannikov, et al. "First observation of neutron emission from chemical reactions." Physics Letters A 156.9 (1991): 514-518.

Atlas Physics Project at the University of Arizona. "Isotopes of Hydrogen." 6 pages. 2014. URL:.

Balin, et al. "Experimental investigation of the muon catalyzed dd-fusion." Physics Letters B 141.3-4 (1984): 173-176.

Balke et al., Limits on neutron emission from "cold fusion" in metal hydrides, Physical Review C, vol. 42, No. 1, Jul. 1990, pp. 30-37.

Basteev, et al. "Activation of solid-phase deflagration of hydrogen-containing energy-storing substances." International journal of hydrogen energy 19.9 (1994): 739-741.

Baym et al., "Neutron Star Matter", Nuclear Physics A, vol. 175, Issue 2, Nov. 1971, pp. 225-271.

Berkovich , "Calendar Variations in the Phenomena of Nature and the Apparition of Two Higgs Bosons", The George Washington University, Department of Computer Science, 2013, 12 pages.

Berlinguette et al. Revisiting the Cold Case of Cold Fusion, Nature, vol. 570, Jun. 6, 2019, p. 45-51, 7 pages.

Bockris, et al. "Cold fusion as a consequence of high fugacity among hydrogen isotopes." International journal of hydrogen energy 17.6 (1992): 445-450.

Borbély, I et al. "Nucleon exchange effects at low bombarding energies for deuteron-neutron scattering." Physics Letters B 283.1-2 (1992): 19-21.

Bosch et al., "Electrochemical Cold Fusion Trials at IPP Garching", Journal of Fusion Energy, vol. 9, No. 2, Jun. 1990, pp. 165-186.

Botter, et al. "Search for emission of neutrons from a palladium-deuterium system." Physics Letters (Section) B; (Netherlands) 232.4 (1989).

Bracci, et al. "A dynamical calculation of the electron shielding for D-D fusion." Physics Letters A 146.3 (1990): 128-133.

Briand, et al. "Cold fusion rates in titanium foils." Physics Letters A 145.4 (1990): 187-191.

Briefing on Low-Energy Nuclear Reactions (LENR) Research, Office of the ASD/R&E) US Dept. of Defense, 2016, 35 pages.

Browne, "'Fusion' Claim is Greeted With Scorn by Physics", The New York Times, vol. CXXXVIII, No. 47,859, May 3, 1989, p. A1 and A22.

Brudanin, et al. "Does cold nuclear fusion exist?. " Physics Letters A 146.6 (1990): 347-350.

Brudanin, et al. "Once more about cold nuclear fusion." Physics Letters A 146.6 (1990): 351-356.

Brudanin, et al. "Search for the cold fusion d (d, 4He) in electrolysis of D2O." Physics Letters A 151.9 (1990): 543-546.

Bruschi, et al. "Search for neutron emission from a deuterium-titanium system." Europhysics Letters 10.4 (1989): 303, 6 pages.

Canadian Office Action in App. No. CA2,900,627, mailed Jan. 10, 2022, 5 pages.

Canadian Office Action in App. No. CA2,900,627, mailed May 6, 2020, 5 pages.

Cartlidge , "Google Fails in Search for Cold Fusion", Physics World, vol. 32, No. 7, 2019, 2 pages.

Celani et al., "Deuterium Overloading of Palladium Wires by Means of High Power US Pulsed Electrolysis and Electromigration: Sug-

(56) References Cited

OTHER PUBLICATIONS gestions of a 'Phase Transition' and a Related Excess Heat", Physics Letters A, vol. 214, Issues 1-2, May 6, 1996, pp. 1-13.
Chambaud, et al. "Estimate of Ti effects on D-D fusion." Physics Letters A 156.7-8 (1991): 395-398.
Chambers et al., "Upper Limit on Cold Fusion in Thin Palladium Film", Physical Review B, vol. 41, No. 8, Mar. 15, 1990, 41 (8):5388-5391.
Chang, et al. "Hydrogen and deuterium in palladium." International journal of hydrogen energy 16.7 (1991): 491-497.
Chapline, "Cold Confusion", The Nuclear Equation of State. Springer US, 1989, pp. 561-565.
Chapnik, "Possibility of electrochemically induced transmutation in PdD." Physics Letters A 161.2 (1991): 111-113.
Chatterjee, et al. "Sub-barrier nuclear fusion of amuonic and muonic flavour." Physics Letters A 154.1-2 (1991): 5-8.
Chinese Office Action in App. No. CN201710822420.1 mailed Mar. 5, 2020, with translation (Not. of Decision to Grant), 5 pages.
Chinese Office Action in App. No. CN201710822420.1, mailed Mar. 13, 2019, with translation, 6 Pages.
Chinese Office Action in Appl. No. 201210160883.3, with translation dated May 11, 2017, 23 pages.
Chinese Office Action in Appl. No. 201210160883.3, with translation dated Jul. 25, 2014, 29 pages.
Chinese Office Action in Appl. No. 201210160883.3, with translation mailed on Mar. 3, 2016, 12 pages.
Chinese Office Action in Appl. No. 201210160883.3, with translation mailed on Nov. 11, 2016, 4 pages.
Chinese Office Action in Appl. No. 201480010594.2, with translation mailed on Nov. 4, 2016, 8 pages.
Chinese Office Action in Appl. No. CN201210160883.3, with translation Jun. 9, 2015, 13 pages.
Chinese Office Action with translation in Appl. No. 201710822420.1 mailed Sep. 25, 2019, 10 pages.
Chinese Office Action with translation in Appl. No. 200680053589.5, dated Mar. 11, 2011, 6 pages.
Chinese Office Action with translation in Appl. No. CN201480010594.2, Notice of Decision to Grant, mailed Jun. 29, 2017, 3 pages.
Chubb et al., "Theoretical Framework for Anomalous Heat and 4He in Transition Metal Systems," Eighth International Conference on Cold Fusion, Lerici, Italy (2000), 6 pages.
Contessi et al., "Emergence of 4H JTT=1—Resonance in Contact Theories", Physics Letters B, vol. 840, 137840, May 10, 2023, pp. 1-7.
Cooke, "ORNL Foreign Trip Report", ORNL/FTR-3341, Oak Ridge National Laboratory, Jul. 31, 1989, 17 pages.
Cravens, "Practical Techniques in CF Research—Triggering Methods", Tenth International Conference on Cold Fusion, 2003, 9 pages.
Cribier et al., "Conventional Sources of Fast Neutrons in "Cold Fusion" Experiments", Physics Letters B, vol. 228, No. 1, 1989, 7 pages.
Czerski, et al. "Enhancement of the electron screening effect for d+d fusion reactions in metallic environments." Europhysics Letters 54.4 (2001): 449-455.
Czerski, et al. "Experimental and theoretical screening energies for the {sup 2} H (d, p){sup 3} H reaction in metallic environments." The European Physical Journal, A 27 (2006), 6 pages.
Czerski, et al. "The 2H (d, p) 3H reaction in metallic media at very low energies." Europhysics Letters 68.3 (2004): 363-369, 7 pages.
Dardik et al. "Intensification of Low Energy Nuclear Reactions Using Superwave Excitation." Tenth International Conference on Cold Fusion, 2003, 12 pages.
Dardik et al., "Progress in Electrolysis Experiments at Energetics Technologies", 12th International Conference on Condensed Matter Nuclear Science, Nov.-Dec. 2005, 31 pages.
Dardik et al., "Ultrasonically-Excited Electrolysis Experiments at Energetics Technologies", ICCF-14, International Conference on Condensed Matter Nuclear Science, 2008, 17 pages.
De Ninno, et al. "Evidence of emission of neutrons from a titanium-deuterium system." Europhysics Letters 9.3 (1989): 221, 4 pages.
Delley, "Effect of electronic screening on cold-nuclear-fusion rates." Europhysics Letters 10.4 (1989): 347, 8 pages.
Dignan et al., "A Search for Neutrons from Fusion in a Highly Deuterated Cooled Palladium Thin Film", Journal of Fusion Energy, vol. 9, No. 4, Dec. 1990, pp. 469-472.
Dragić, et al. "Comment on "On the Barut-Vigier model of the hydrogen atom" by Samsonenko et al." Physics Letters A 229.2 (1997): 130-132.
Dragić, et al. "New quantum mechanical tight bound states and 'cold fusion' experiments." Physics Letters A 265.3 (2000): 163-167.
Dufour, et al. "Hydrogen triggered exothermal reaction in uranium metal." Physics Letters A 270.5 (2000): 254-264, 15 pages.
European Office Action in App. No. EP06851215.1, EESR, Jan. 4, 2016, 10 pages.
European Office Action in App. No. EP06851215.1, Notice of Decision to Grant, mailed Aug. 30, 2018, 2 pages.
European Office Action in App. No. EP14785797.3, EESR, mailed Jan. 2, 2018, 11 pages.
European Office Action in App. No. EP14785797.3, Partial Supplementary ESR, mailed Aug. 2, 2017, 12 pages.
European Office Action in App. No. EP18185763.2, EESR, mailed Apr. 25, 2019, 9 pages.
European Office Action in Appl. No. EP06851215.1 dated Jul. 24, 2017, 6 pages.
Ewing et al., "A Sensitive Multi-Detector Neutron Counter Used To Monitor 'Cold Fusion' Experiments In an Underground Laboratory; Negative Results and Positive Artifacts", IEEE Transactions on Nuclear Science, vol. 37, No. 3, Jun. 1990, pp. 1165-1170.
Faller et al., "Investigation of Cold Fusion in Heavy Water", J. Radioanal. Nucl. Chem., Letters, 137, Aug. 21, 1989, pp. 9-16.
Fedorovich, "Quantum-mechanical screening." Physics Letters A 164.2 (1992): 149-154.
Final Office Action for U.S. Appl. No. 11/617,632 mailed Dec. 24, 2009, 22 pages.
Final Office Action for U.S. Appl. No. 12/911,586 mailed Mar. 23, 2011, 18 pages.
Final Office Action for U.S. Appl. No. 12/911,586 mailed May 14, 2012, 20 pages.
Final Office Action for U.S. Appl. No. 12/911,586, mailed May 10, 2013, 18 pages.
Fischer, et al. "Neutron emission observed during the electrical explosion of deuterated liquids of metallic conductivity." Physics Letters B 44.2 (1973): 161-162.
Fleischmann et al., "Electrochemically Induced Nuclear Fusion of Deuterium", J. Electroanal. Chem., vol. 261, 1989, pp. 301-308.
Fleischmann, et al. "Calorimetry of the Pd-D2O system: from simplicity via complications to simplicity." Physics Letters A 176.1-2 (1993): 118-129, 12 pages.
Fleischmann, et al. "Reply to the critique by Morrison entitled:"Comments on claims of excess enthalpy by Fleischmann and Pons using simple cells made to boil"." Physics Letters A 187.3 (1994): 276-280.
Fleming et al., "Calorimetric Studies of Electrochemical Incorporation of Hydrogen Isotopes into Palladium", J. of Fusion Energy, vol. 9, No. 4, Dec. 1990, pp. 517-524.
Flitt, et al. "Concerning adsorbed and absorbed hydrogen on and in ferrous metals." International Journal of Hydrogen Energy 7.5 (1982): 411-427.
Frolov, et al. "On stimulated nuclear fusion in the cold generalized DT hydrides of fissionable elements." Physics Letters A 196.1-2 (1994): 217-222, 6 pages.
Fukai, "The ABC's of the Hydrogen-Metal System", Frontiers of Cold Fusion, Universal Academy Press, 1993, pp. 265-274.
Fullenwider, "A method for the determination of energy gaps in hydrogen-metal systems." International journal of hydrogen energy 11.4 (1986): 285-286.
George, "Production of 4He from Deuterium During Contact with Nano-Particle Palladium on Carbon at 200° C. and 3 Atmosphere Deuterium Pressure", American Physical Society Centennial Conference, Mar. 26, 1999, 6 pages.

(56) References Cited

OTHER PUBLICATIONS

Georgia State University. “Temperatures for Fusion.” 1 page. The Department of Physics and Astronomy. HyperPhysics. 2016. URL.
Goldanskii, et al. “On the possibilities of “cold enhancement” of nuclear fusion.” Physics Letters B 234.4 (1990): 465-468.
Graneau, et al. “Ampère force calculation for filament fusion experiments.” Physics Letters A 174.5-6 (1993): 421-427, 7 pages.
Graneau, et al. “The role of Ampere forces in nuclear fusion.” Physics Letters A 165.1 (1992): 1-13.
Green, “Quantitative determination of high-Tc superconductivity from the lattice polarization, structure effect and approach to 300 K Tc.” Physics Letters A 227.5-6 (1997): 372-380, 9 pages.
Hajdas et al., “Search for cold-fusion events”, Solid State Communications, vol. 72, No. 4, 1989, pp. 309-313.
Henderson et al., “More searches for cold fusion”, J. of Fusion Energy, vol. 9, No. 4, Dec. 1990, pp. 475-477.
Herrero, et al. “Location of the low temperature resistivity anomaly in Pd-D.” Physics Letters A 86.1 (1981): 29-31.
Hilts, “Significant Errors Reported in Utah Fusion Experiments”, The Washington Post, May 2, 1989, 1 page.
U.S. Appl. No. 61/769,643, filed Feb. 26, 2013.
U.S. Appl. No. 63/505,528, filed Jun. 1, 2023.
U.S. Appl. No. 63/652,279, filed May 28, 2024.
Takahashi, et al. “Detection of three-body deuteron fusion in titanium deuteride under the stimulation by a deuteron beam.” Physics Letters A 255.1-2 (1999): 89-97.
Tripodi, et al. “Temperature coefficient of resistivity at compositions approaching PdH.” Physics Letters A 276.1-4 (2000): 122-126.
Tripodi, et al. “The effect of hydrogen stoichiometry on palladium strain and resistivity.” Physics Letters A 373.47 (2009): 4301-4306.
Tripodi, et al. “The effect of hydrogenation/dehydrogenation cycles on palladium physical properties.” Physics Letters A 373.35 (2009): 3101-3108.
Tsuchiya, “Quantum states of deuterons in Pd.” International journal of hydrogen energy 29.14 (2004): 1513-1519.
U.S. Appl. No. 16/048,915, Final Office Action mailed Jul. 1, 2020, 40 pages.
U.S. Appl. No. 16/048,915, Non-Final Office Action mailed May 30, 2019, 44 pages.
U.S. Appl. No. 11/617,632, “Restriction Requirement”, mailed Nov. 17, 2008, 7 pages.
U.S. Appl. No. 12/911,586 , “Final Office Action”, dated May 10, 2013, 19 pages.
U.S. Appl. No. 12/911,586, “Final Office Action”, mailed May 14, 2012, 20 pages.
U.S. Appl. No. 14/189,751, “Non-Final Office Action”, dated Feb. 2, 2017, 45 pages.
U.S. Appl. No. 14/189,751, “Final Office Action”, mailed Nov. 29, 2017, 33 pages.
U.S. Appl. No. 14/189,751, “Restriction Requirement”, mailed Sep. 6, 2016, 5 pages.
U.S. Appl. No. 14/275,653 Non-Final Office Action dated Dec. 22, 2017, 17 pages.
U.S. Appl. No. 14/275,653, “Restriction Requirement”, mailed Apr. 2, 2017, 10 pages.
U.S. Appl. No. 14/769,776, “Restriction Requirement”, mailed Oct. 19, 2017, 9 pages.
U.S. Appl. No. 16/016,318, “Non-Final Office Action”, mailed Aug. 18, 2021, 23 pages.
U.S. Appl. No. 16/048,915, “Restriction Requirement”, mailed Mar. 11, 2019, 6 pages.
U.S. Department of Energy “Low-Energy Nuclear Reactions”, ARPA-E, Available online at https://arpa-e.energy.gov/technologies/exploratory-topics/low-energy-nuclear- reactions, Accessed from Internet on Jul. 5, 2023, pp. 1-3.
U.S. Department of Energy, “Report of the Review of Low Energy Nuclear Reactions,” 5 pages (2004).
Vigier, “On cathodically polarized PdD systems.” Physics Letters A 221.1-2 (1996): 138-140.
Vijh, et al. “Electrocatalysis of the hydrogen evolution reaction by metals and silver-palladium alloys in relation to their electronic configuration.” International Journal of Hydrogen Energy 11.3 (1986): 147-151.
Widom et al., “Ultra Low Momentum Neutron Catalyzed Nuclear Reactions On Metallic Hydride Surfaces”, Eur. Phys. J. C, vol. 46, pp. 107-111; Mar. 9, 2006.
Wilson, “Responsible authorship and peer review”, Science and Engineering Ethics vol. 8, No. 2, 2002, pp. 155-174.
Xiao, et al. “Volatile compound profiling from soybean oil in the heating process.” Food Science & Nutrition 8.2 (2020): 1139-1149.
Xiao, et al. “The possibilities for initiation of the cold fusion of the deuterons in the hydrogen storage materials.” International journal of hydrogen energy 24.8 (1999): 741-746.
Zhang, et al. “Numerical simulation of diffusivity of hydrogen in thin tubular metallic membranes affected by self-stresses.” International journal of hydrogen energy 29.11 (2004): 1165-1172, 8 pages.
Zhao et al., “Evolution of Stars—Birth and Death”, Dec. 31, 1983, 5 pages.
Zhu, et al. “Nonlinear effects on thermonuclear reaction rates.” Physics Letters A 144.6-7 (1990): 361-364.
Ziegler et al., “Electrochemical experiments in cold nuclear fusion”, Physical Review Letters, vol. 62, No. 25, Jun. 19, 1989, pp. 2929-2932.
Merrimen et al., “An Attempted Replication of the CETI Cold Fusion Experiment”, http://web. archive. org/web/20040618082220/http://www.math.ucla.edu/barry /CF/CETIX.html, pp. 1-14.
Mills, Author’s Response to a Letter to the Editor, Int. J. Hydrogen Energy 2003, 28, 359-360.
Mintmire, et al. “Chemical forces associated with deuterium confinement in palladium.” Physics Letters A 138.1-2 (1989): 51-54, 4 pages.
Miskelly et al., “Analysis of the Published Calorimetric Evidence for Electrochemical Fusion of Deuterium in Palladium”, Science, vol. 246, No. 4931, 1989, pp. 793-796.
Mizuno, et al. “Anomalous y peak evolution from SrCe solid state electrolyte charged in D2 gas.” International journal of hydrogen energy 22.1 (1997): 23-25.
Morrison, “Comments on claims of excess enthalpy by Fleischmann and Pons using simple cells made to boil.” Physics Letters A 185.5-6 (1994): 498-502.
Mosier-Boss et al., “Condensed Matter Nuclear Reactions”, Whitepaper, available online at https://www.academia.edu/17964553/Condensed_Matter_Nuclear_Science_ October_20 15, 2015, 31 pages.
Mosier-Boss et al., “DTRA: Investigation of Nano-Nuclear Reactions in Condensed Matter Final Report”, Technical Report Prepared for the Defense Threat Reduction Agency, Available at: https://www.researchgate.net/publication/307594560, Jun. 2016, 131 pages.
Mosier-Boss et al., “Use of CR-39 in Pd/D Co-Deposition Experiments,” European Physical Journal: Applied Physics 40: 293-303 (2007).
Mosier-Boss, et al. “Characterization of tracks in CR-39 detectors obtained as a result of Pd/D Co-deposition.” The European Physical Journal-Applied Physics 46.3 (2009): 30901, 12 pages.
Mosier-Boss, et al. “Comparison of Pd/D co-deposition and DT neutron generated triple tracks observed in CR-39 detectors.” The European Physical Journal—Applied Physics 51.2 (2010): 20901, 10 pages.
Mosier-Boss, et al., “Reply to Comment on ’The Use of CR-39 in Pd/D Co-Deposition Experiments’: a Response to Kowalski”, The European Physical Journal of Applied Physics, vol. 44, Dec. 6, 2008, pp. 291-295.
Mosier-Boss, et al., Reply to Comment on ’The Use of CR-39 in Pd/D Co-deposition Experiments’: A Response to Kowalski. Eur. Phys. J. Appl. Phys. 2008, 44, 287-290, 5 pages.
Nagel, “Evidence of Operability and Utility from Low Energy Nuclear Reaction Experiments”, NUCAT Energy LLC Report Jan. 2017, Aug. 1, 2017, 48 pages.
Nagel, “From Cold Fusion to Low Energy Nuclear Reactions and Beyond”, USPTO Tech Fair, Jun. 7, 2018, 42 pages.
National Nuclear Data Center. NuDat 2.7. 1 page. Decay Mode for 4-Hydrogen. accessed 2019. URL:.

(56) References Cited

OTHER PUBLICATIONS

Non-Final Office Action for U.S. Appl. No. 11/617,632 mailed Apr. 2, 2009, 24 pages.
Norton, et al. "Introduction: metal hydrides." Chemical Reviews 116.15 (2016): 8315-8317.
Ohashi et al., "Decoding of Thermal Data in Fleischmann & Pons Paper", J. of Nucl. Sci. and Tech., vol. 26, No. 7, Jul. 1989, pp. 729-732.
Olayo, et al. "Absorption of deuterium in titanium plates induced by electric discharges." International journal of hydrogen energy 23.10 (1998): 885-890.
Palleschi, et al. "A plasma model of the process of cold nuclear fusion in metals." Physics Letters A 148.6-7 (1990): 345-350.
Partial Supplementary European Search Report in European App. No. EP14785797.3, dated Aug. 2, 2017, 12 pages.
Petrasso et al., Problems with the y-ray spectrum in the Fleischmann et al. experiments, Nature, vol. 339, May 18, 1989, pp. 183-185.
Petrillo, et al. "A possible mechanism for bulk cold fusion in transition metals hydrides." Europhysics Letters 10.1 (1989): 15, 5 pages.
Price et al., "Search For Energetic-Charged-Particle Emission from Deuterated Ti and Pd Foils", Physical Review Letters, vol. 63, No. 18, Oct. 30, 1989, pp. 1926-1929.
Raiola et al., "Electron Screening In D(D,P)T For Deuterated Metals And The Periodic Table", Physics Letters B 547 (Issues 3-4), 2002, 193-199.
Rambaut, "Double screened Coulomb barrier accounts for neutrons production in cluster and other fusion experiments." Physics Letters A 164.2 (1992): 155-163.
Ravnitzky, "This Is Not 'Cold Fusion'", U.S. Naval Institute Proceedings Magazine, vol. 144/9/1,387, Sep. 2018, 9 pages.
Reifenshweiler, "Reduced radioactivity of tritium in small titanium particles." Physics Letters A 184.2 (1994): 149-153, 6 pages.
Restriction Requirement for U.S. Appl. No. 11/617,632 mailed Nov. 17, 2008, 7 pages.
Rice-Evans, et al. "Search for neutrons from cold nuclear fusion." European Journal of Physics 11.4 (1990): 251, 3 pages.
Rogers et al., "Cold Fusion Reaction Products and Their Measurement", J. of Fusion Energy, vol. 9, No. 4, Dec. 1990, pp. 483-485.
Ronnebro, et al. "Metal hydrides for high-temperature power generation." Energies 8.8 (2015): 8406-8430.
Salamon et al., "Limits on the emission of neutrons, y-rays, electrons and protons from Pons/Fleischmann electrolytic cells", Nature, vol. 344, Mar. 3, 1990, pp. 401-405.
Samsonenko, et al. "On the Barut-Vigier model of the hydrogen atom." Physics Letters A 220.4-5 (1996): 297-301.
Samsonenko, et al. "Reply to the comment on "On the Barut-Vigier model of the hydrogen atom"." Physics Letters A 229.2 (1997): 133-134.
Sankaranarayanan, et al., "Evidence for Tritium Generation in Self-Heated Nickel Wires Subjected to Hydrogen 3as Absorption/Desorption Cycles", Fifth International Conference on Cold Fusion, 1995, 8 pages.
Schrieder et al., "Search for cold nuclear fusion in palladium-deuteride", Z. Phys. B—Condensed Matter, vol. 76, No. 2, 1989, pp. 141-142.
Segre, et al. "A mechanism for neutron emission from deuterium trapped in metals." Europhysics Letters 11.3 (1990): 201, 7 pages.
Seifritz, et al. "Letter to Editor." International Journal of Hydrogen Energy 28.3 (2003): p. 357, 1 page.
Shani et al., "Evidence for a background neutron enhanced fusion in deuterium absorbed palladium", Solid State Communications, vol. 72, No. 1, 1989, pp. 53-57.
Smith et al., "Electrolytic Co-Deposition Neutron Production Measured by Bubble Detectors", Journal of Electroanalytical Chemistry, vol. 882, Feb. 1, 2021, pp. 1-7.
Sohlberg, et al. "Fusion rates for deuterium in titanium clusters." Physics Letters A 144.6-7 (1990): 365-370, 6 pages.
Song et al., Low-temperature Nuclear Fusion Event and Enlightenment Thereof, Department of Chemistry of Tsinghua University, Dec. 31, 1997, pp. 54-58, English translation only.
Stipp et al., "Georgia Group Outlines Errors That Led To Withdrawal of 'Cold Fusion' Claims", The Wall Street Journal, Apr. 26, 1989, p. B4.
Stritzker, et al. "Superconductivity in metastable Pd-alloys produced by ion implantation at low temperatures." Physics Letters A 51.3 (1975): 147-148.
Szefliński, et al. "Upper limit of neutron emission from the chemical reaction of LiD with heavy water." Physics Letters A 168.1 (1992): 83-86.
Szpak, et al. "On the behavior of the cathodically polarized PdD system: a response to Vigier's comments." Physics Letters A 221.1-2 (1996): 141-143.
Szpak, et al. "On the behavior of the cathodically polarized PdD system: Search for emanating radiation." Physics Letters A 210.6 (1996): 382-390, 9 pages.
Tabet, et al. "Nuclear reactions from lattice collapse in a cold fusion model." Physics Letters A 144.6-7 (1990): 301-305.
Hora, et al. "Screening in cold fusion derived from DD reactions." Physics Letters A 175.2 (1993): 138-143, 6 pages.
Huizenga, "Cold Fusion Labeled Fiasco of Century", Forum for Applied Research and Public Policy, vol. 7, No. 4, 1992, pp. 78-83.
Huke, et al. "Evidence for a host-material dependence of the n/p branching ratio of low-energy d+ d reactions within metallic environments." The European Physical Journal A—Hadrons and Nuclei 27 (2006): 187-192, 6 pages.
Indian App. No. 3960CHENP2008.
International Preliminary Report in PCT/US2006/062683, Jul. 1, 2008, 5 pages.
International Preliminary Report in PCT/US2014/018523, mailed Sep. 1, 2015, 6 pages.
International Search Report and Written Opinion in International App. No.PCT/US2024/032316 mailed Mar. 12, 2025, 67 pages.
International Search Report and Written Opinion in PCT/US2006/062683 mailed Nov. 19, 2007, 8 pages.
International Search Report and Written Opinion in PCT/US2014/018523 dated Jan. 21, 2015, 16 pages.
Invitation to Pay Additional Fees and Partial Search Report in PCT/US2014/018523 Oct. 22, 2014, 2 pages.
Isagawa , "Mass Spectroscopic Means for Determining 4He In the Presence of Large Amounts of D2", Vacuum, vol. 47, No. 6-8, 1996, pp. 497-499, 3 pages.
Japanese Office Action App. No. 2008-548857, mailed on Jul. 10, 2012, with translation 34 pages.
Japanese Office Action in 2008-548857, with translation dated Apr. 17, 2013, 7 pages.
Japanese Office Action in App. No. 2008-548857, Appeal Rejection, with translation dated May 9, 2014, 29 pages.
Japanese Office Action in App. No. 2008-548857, with translation dated Dec. 6, 2012, 7 pages.
Japanese Office Action in App. No. 2008-548857, with translation dated Jan. 10, 2012, 9 pages.
Japanese Office Action in App. No. 2008-548857, with translation Sep. 6, 2013, 10 pages.
Japanese Office Action in App. No. 2015-559291, with translation dated Jan. 25, 2018, 12 pages.
Japanese Office Action in App. No. 2018-139578 with translation mailed Jul. 2, 2019, 15 pages.
Japanese Office Action with translation in App. No. 2018-139578, mailed Apr. 16, 2020, 5 pages.
Kaliev, et al. "Reproducible nuclear reactions during interaction of deuterium with oxide tungsten bronze." Physics Letters A 172.4 (1993): 199-202.
Karabut, et al. "Nuclear product ratio for glow discharge in deuterium." Physics Letters A 170.4 (1992): 265-272, 12 pages.
Karandikar et al., Microporous, Single Crystal Oxide Materials, Foster-Miller, Inc., 6 pages.
Karandikar et al., "Single-Crystal YAG Reinforcement Preforms for Refractory Composites", John H. Glenn Research Center, May 1, 1999, 2 pages.

(56) References Cited

OTHER PUBLICATIONS

Kaushik, et al. "Experimental investigations on neutron emission from projectile-impacted deuterated solids." Physics Letters A 232.5 (1997): 384-390.
Kirkinskii, et al. "A new approach to theoretical modelling of nuclear fusion in palladium deuteride." Europhysics Letters 46.4 (1999): 448, 7 pages.
Kirkinskii, et al. "Excess heat release during deuterium sorption-desorption by finely powdered palladium deuteride." Europhysics Letters 58.3 (2002): 462, 6 pages.
Kitamura, et al. "Anomalous effects in charging of Pd powders with high density hydrogen isotopes." Physics Letters A 373.35 (2009): 3109-3112.
Kitamura, et al. "Excess heat evolution from nanocomposite samples under exposure to hydrogen isotope gases." International Journal of Hydrogen Energy 43.33 (2018): 16187-16200, 14 pages.
Klebanoff, et al. "Final report for the DOE metal hydride center of excellence." Sandia National Laboratories, Albuquerque, NM, Report No. SAND2012-0786 (2012), 163 pages (9 parts).
Korean Office Action with Google Translation in App. No. KR2015-7026686, mailed Jun. 19, 2020, 24 pages.
Koval'chuk, et al. "Electromagnetic radiation during electrolysis of heavy water." Physics Letters A 189.1-2 (1994): 15-18.
Kowalski, "Comment on 'The Use of CR-39 in Pd/D Co-Deposition Experiments' by P.A. Mosier-Boss, Szpak, Gordon, Forsley: Interpreting SPAWAR-Type Dominant Pits," European Physical Journal: Applied Physics 44: 287-290 (2008), 5 pages.
Kozima, et al. "First reliable tritium data by Packham et al. analyzed by TNCF model." International journal of hydrogen energy 25.6 (2000): 505-507.
Kozima, et al. "Local coherence, condensation and nuclear reaction of neutrons at crystal boundary of metal hydrides and deuterides." International journal of hydrogen energy 25.9 (2000): 845-851, 7 pages.
Kozima, et al. "Localized nuclear transmutation in PdHx observed by Bockris and Minevski revealed a characteristic of CF phenomenon." International journal of hydrogen energy 25.6 (2000): 513-516, 4 pages.
Kozima, et al. "Tritium and 4He data by Chien et al. confirmed the cold fusion phenomenon." International journal of hydrogen energy 25.6 (2000): 509-511, 3 pages.
Kreysa et al., "A critical analysis of electrochemical nuclear fusion experiments", J. Electroanal. Chem., vol. 266, 1989, pp. 437-450.
Kühne, "Cold fusion: pros and cons." Physics Letters A 155.8-9 (1991): 467-472, 6 pages.
Kühne, "Possible explanations for failures to detect cold fusion." Physics Letters A 159.4-5 (1991): 208-212, 5 pages.
Lawson, "Some criteria for a Power Producing Thermonuclear Reactor", Proceedings of the Physical Society, Section B, vol. 70, Jan. 1957, pp. 6-10, 5 pages.
Lewis et al., "Searches for low-temperature nuclear fusion of deuterium in palladium", Nature, vol. 340, No. 6234, 1989, pp. 525-530.
Lewis, et al. "The "uphill" diffusion of hydrogen: strain-gradient-induced effects in palladium alloy membranes." International journal of hydrogen energy 13.7 (1988): 439-442.
Liboff, "Feasibility of fusion of an aggregate of deuterons in the ground state." Physics Letters A 174.4 (1993): 317-319.
Liboff, "Fusion via metallic deuterium." Physics Letters A 71.4 (1979): 361-362.
Lin, et al. "On electrochemical tritium production." International journal of hydrogen energy 15.8 (1990): 537-550, 14 pages.
Lindstrom, "Believable Statements of Uncertainty and Believable Science," Journal of Radioanalytical and Nuclear Chemistry, vol. 311, No. 2, Feb. 2017, 4 pages.
Lipson, et al. "On the initiation of DD reactions in the zirconium-deuterium system." Physics Letters A 166.1 (1992): 43-46, 4 pages.
Luedecki, et al. "Thermodynamic characterization of metal hydrogen systems by assessment of phase diagrams and electrochemical measurements." International journal of hydrogen energy 12.2 (1987): 81-88.
Ma, et al. "Nuclear-fusion enhancement in condensed matter with impacting and screening." Europhysics Letters 24.4 (1993): 305, 7 pages.
"Francis Tanzella—ICCF25—Total Calorimetry ("from the wall") in a Brillouin Reactor," YouTube, Sep. 29, 2023. Accessed at https://youtu.be/b1LhYKHRTIQ, 1 page.
Godes, et al. "Controlled electron capture and the path to commercialization, J." Condensed Matter Nucl. Sci 13 (2015): 127, 11 pages.
International Search Report and Written Opinion in International App. No. PCT/US2025/031186 mailed Sep. 15, 2025, 14 pages.
Lenr-Forum, "Meet Francis Tanzella-LENR Heat Technology." YouTube, Apr. 24, 2021. Accessed at https://www.youtube.com/watch?v=4Asilyla-YY, 1 page.
Tanzella Presentation "Mass (and heat) flow calorimetry in Brillouin's reactor." Energy Research Center, ICCF22, Italy, Sep. 8, 2019, 28 pages.
Tanzella Presentation "Total Calorimetry ("From the Wall") in a Brillouin Reactor." Poland, Aug. 27, 2023, Energy Research Center, 27 pages.
Tanzella, et al. "Mass and heat flow calorimetry in Brillouin's reactor." Journal of Condensed Matter Nuclear Science 33.1 (Aug. 2020): 33-45, ICCF 22 Conference, 16 pages.
Tanzella, et al. "Nanosecond pulse stimulation in the ni-h2 system." Journal of Condensed Matter Nuclear Science 29.1 (2019): 202-210.
Macy "On the Quest for a Commerical LENR Reactor with Robert Godes and Brillouin Energy" Infinite Energy, Issue 123, 2015, 9 pages.
Tanzella, "Brillouin's LENR Reactor and System Identification, A Worked Example" ARPA-E Workshop on Low-Energy Nuclear Reactions, Energy Research Center LLC, Oct. 21-22, 2021, 15 pages.

* cited by examiner

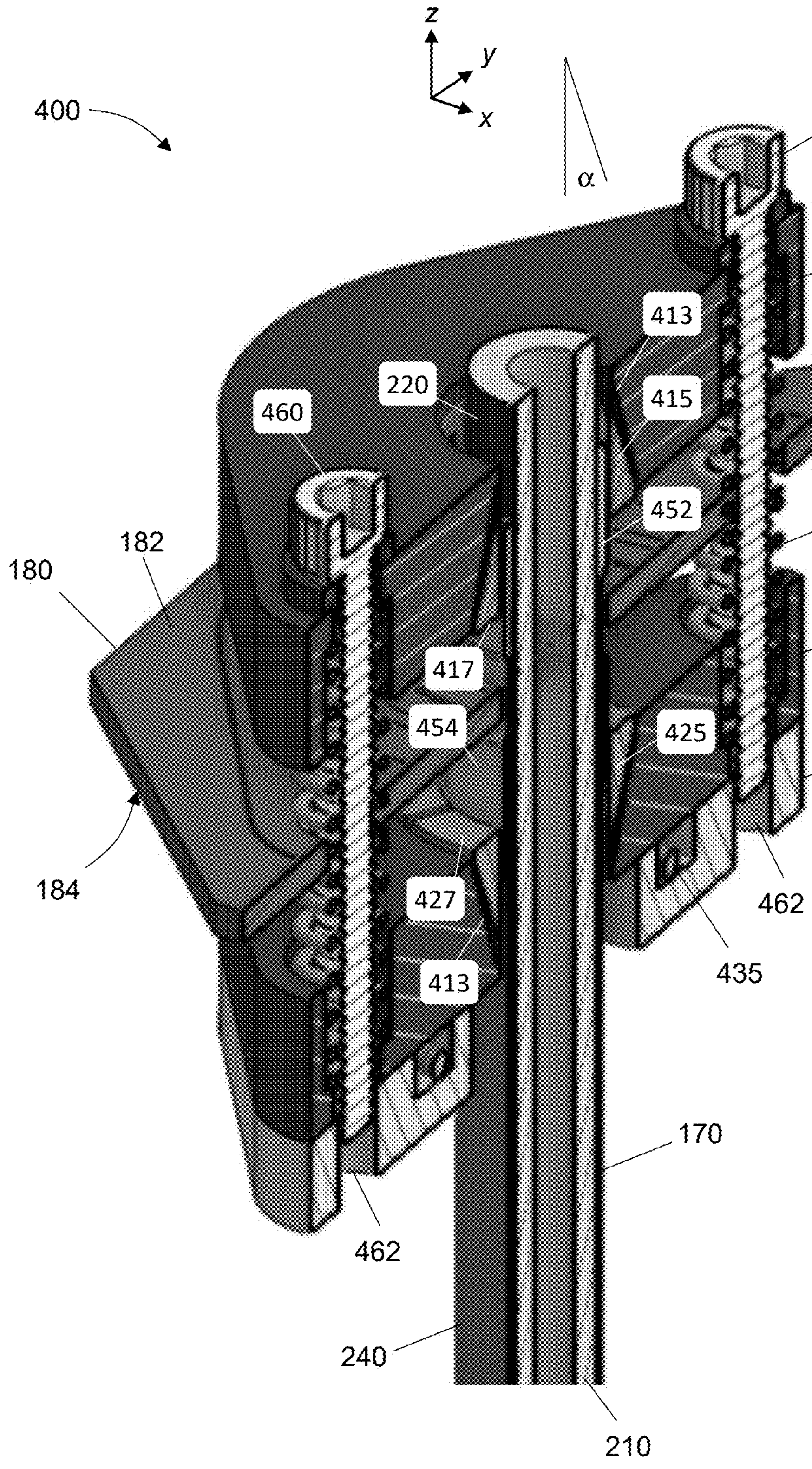
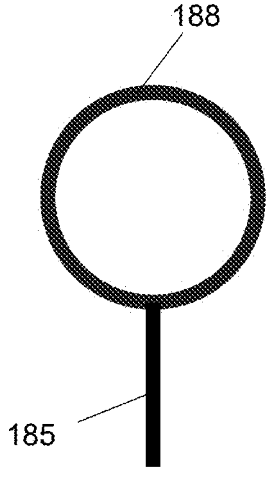
FIG. 4B
FIG. 4A

HEATING SYSTEM AND METHODS

CROSS-REFERENCE TO RELATED APPLICATION

The present application claims a priority benefit, under 35 U.S.C. § 119 (e), to U.S. provisional application Ser. No. 63/652,279, filed on May 28, 2024, entitled "Heating Systems and Methods," which provisional application is incorporated by reference herein in its entirety.

BACKGROUND

Efficient conversion of one form of energy to another form of energy is generally desirable and useful. For example, efficient conversion of solar energy to electrical energy is desirable and useful for commercial electric power providers as well as residential and industrial entities. Similarly, efficient conversion of chemical and/or electrochemical energy to one or more of mechanical energy, electrical energy, or thermal energy is desirable and useful for multiple industries.

Thermal energy (e.g., the internal kinetic energy within particles of a substance) plays an important role across various applications and industries where various heating, cooling and/or controlled temperature conditions are required. When applied to water and other fluids, thermal energy becomes an efficient medium for heat transfer and storage. The high specific heat capacity and widespread availability of water make it particularly suitable for applications that demand regulated thermal conditions. These properties have established heated water as a fundamental resource in fields such as energy production, manufacturing, chemical processing, food processing, HVAC systems, and environmental management.

The utility of thermal energy in heating water stems from water's ability to absorb and retain heat efficiently, allowing it to serve as a thermal energy reservoir that can be used across multiple stages and processes. This makes water heating essential not only for direct applications but also as a secondary mechanism in broader systems, where controlled heating and cooling cycles are required to maintain operational stability, product quality, and energy efficiency.

The significance of heating water using thermal energy dates back to the Industrial Revolution, when steam engines powered by heated water created new opportunities for industry and transportation. The transformation of water into steam allowed for the development of machinery that drove mass production, powered locomotives, and laid the groundwork for modern industrial operations. The use of thermal energy to boil water and generate steam was one of the first major instances of harnessing controlled thermal processes on a large scale, creating a foundation for subsequent technological progress.

As boiler technology advanced, industries were able to harness water heating more safely and efficiently, enabling its use in a wider range of applications. By the mid-20th century, thermal energy in water heating had become an essential component in sectors from public utilities to private industrial systems, where it supported various manufacturing and energy production needs. Today, the role of thermal energy in water heating has expanded even further to include renewable energy sources, such as solar thermal and geothermal systems, highlighting the evolution of this technology in response to the increasing demand for sustainable and efficient energy solutions.

SUMMARY

The Inventors have recognized and appreciated that, as various industries continue to seek advancements in energy conservation and sustainability, improvements in the technology of water heating have become paramount. In particular, the need for one or both of precision or efficiency in heating solutions within multiple industries underscores the value of new technologies that can reduce energy consumption while providing thermal energy. As energy and environmental concerns continue to grow and the demand for thermal energy rises, virtually all industries are increasingly interested in innovative systems that generate and/or use thermal energy that offer greater efficiency, adaptability, sustainability and flexibility at various scales.

In view of the foregoing, the present disclosure is directed generally to inventive thermal energy generation systems and methods designed to heat fluids (e.g., water) based at least in part on electrically-stimulated catalytic reactions that convert electrical energy to thermal energy. Conventional water heating systems, such as resistive electric heaters and combustion-based boilers, are often hindered by energy inefficiencies, high operational costs, and negative environmental impacts. In contrast, the inventive systems and methods disclosed herein take a fundamentally different approach by employing short, wideband electrical pulses to initiate exothermic reactions within one or more reactive layers of a specially-engineered catalyst. The inventive concepts described herein enable direct and efficient conversion of electrical energy to thermal energy and heat transfer to the surrounding fluid, thereby significantly enhancing energy utilization, significantly lowering overall energy consumption, and extending the system's operational lifespan. The inventive concepts described herein present a scalable and environmentally-friendly alternative to conventional heating systems, making the systems and methods disclosed herein well-suited for applications ranging from residential heating to large-scale industrial uses.

Unlike some conventional systems that rely on indirect heat transfer, the heat-generating catalytic reactions in examples of the inventive systems and methods disclosed herein occur directly within and/or on one or more reactive layers of one or more catalytic tubes, providing essentially immediate heat transfer to the fluid. This significantly reduces thermal energy losses often seen in resistive and combustion-based conventional heating systems, where a portion of the generated heat is lost to the surrounding environment or through intermediary materials. By positioning the heat source within one or more reactive layers of a catalytic tube, the inventive systems and methods disclosed herein achieve relatively higher energy utilization, making these systems and methods significantly more efficient than conventional systems and methods and reducing overall energy waste.

In example implementations of the inventive systems and methods disclosed herein, heat is generated in response to an electrical-pulse-driven activation mechanism. In particular, a pulse driver coupled to one or more catalytic tubes delivers relatively short, controlled bursts of electrical energy that stimulate catalytic reactions in the catalytic tube(s) when heat is needed. This example of an "on-demand" heating capability contrasts with conventional systems that often rely on a continuous energy input to maintain temperature. By operating predominantly (or in some instances exclusively) in response to heating requirements, a pulse-driven activation mechanism according to the inventive concepts disclosed herein reduces standby energy losses, ensuring that heat production aligns with real-time demand. This translates to greater energy conservation, reduced operational costs, and a smaller environmental footprint, making the technology particularly valuable for applications with fluctuating heating needs.

In yet another aspect, the pulse-driven activation mechanism provides significant precision in temperature control, a noteworthy advantage in industries that require strict thermal management (e.g., chemical processing, food production, and pharmaceuticals). By adjusting one or more of the frequency, amplitude, duty cycle and/or spectral content (e.g., pulse width) of the electrical pulses applied to one or more catalyst tubes, the systems and methods disclosed herein can fine-tune heat output, ensuring that the heated fluid reaches and effectively maintains the temperature necessary for a particular application with sufficient precision. Such precision significantly reduces risks of overheating or underheating, both of which are common in conventional systems that often struggle with responsive temperature control. The adaptability of the disclosed systems and methods across a wide range of fluid volumes and temperatures makes them suitable for residential, commercial, and industrial applications, positioning these inventive systems and methods as versatile and more effective solutions for diverse heating needs.

In some example implementations of the inventive systems and methods disclosed herein, another advantageous aspect relates to one or more integrated energy recovery features. For example, during the catalytic reactions, excess energy generated within one or more reactive layers of a catalytic tube can be captured and redirected back into the heating process. This reclaimed energy significantly increases thermal efficiency, reducing overall power consumption and enhancing performance. Unlike conventional heating systems and methods, which generally lack any mechanism to recapture "unused" thermal energy, such built-in recovery features allow the systems and methods disclosed herein to achieve exceptionally high energy utilization rates, thereby outperforming both resistive and combustion-based systems in energy-intensive settings. This capability offers additional savings and aligns with goals to significantly reduce environmental impact by seeking to utilize an appreciable portion, if not virtually all, of the thermal energy generated.

In yet another aspect of the inventive systems and methods disclosed herein, adverse emissions from thermal energy-generating reactions are significantly reduced, if not virtually eliminated in some examples, thereby reducing environmental impact. Traditional heating systems, particularly combustion-based models, present significant environmental concerns due to greenhouse gas emissions and pollutant byproducts. As noted above, the inventive concepts disclosed herein are employed to generate thermal energy through electrically-stimulated reactions rather than fuel combustion, which significantly reduces emissions. By avoiding fossil fuel combustion, the systems and methods based on the inventive concepts disclosed herein significantly reduce emissions of carbon dioxide, nitrogen oxides, and particulate matter, offering a cleaner and more sustainable alternative. Even when powered by non-renewable electricity sources, the system's high efficiency results in a smaller environmental footprint compared to conventional systems. Furthermore, as it aligns with global efforts to transition toward renewable energy, the system is compatible with renewable power sources like solar and wind energy, further enhancing its sustainability profile.

In yet another aspect, systems and methods based on the inventive concepts disclosed herein emphasize longevity and reliability, particularly through the use of robust materials in the reactive layers of catalytic tubes. Materials such as nickel or other transition metals are chosen for their durability, high thermal conductivity, and resistance to degradation, allowing them to withstand repeated catalytic reactions without significant wear. In contrast, conventional heating elements, especially those exposed to high-temperature fluctuations, are prone to corrosion, mineral scaling, and eventual degradation. The durable design arising from the inventive concepts disclosed herein significantly reduces maintenance needs and system downtime, and extends the lifespan of the equipment, offering a cost-effective and long-lasting heating solution. The lower maintenance frequency not only enhances reliability but also reduces the overall cost of ownership.

In yet another aspect, the inventive concepts disclosed herein facilitate design of systems having a flexible and modular design, rendering these systems adaptable and scalable across a wide range of applications, from small residential uses to large-scale industrial processes. In residential settings, systems according to the inventive concepts disclosed herein provide a compact, efficient solution for household water heating (such as radiant floor heating, baseboard hot-water heating, radiator hot-water or steam heating, heated swimming pools, saunas, hot tubs, etc.), offering homeowners an eco-friendly and cost-effective alternative to traditional electric or gas water heaters. The pulse-driven catalytic design ensures that heat is only produced on demand, reducing standby losses typical in conventional home water heaters. Additionally, its energy efficiency and low maintenance requirements appeal to homeowners seeking to lower both energy bills and carbon footprint. For industrial applications, the system can be configured with larger catalytic tube arrays and advanced pulse control systems to meet high demands in factories, processing plants, and facilities that require continuous or high-capacity heating. Industrial settings, where operational costs are heavily influenced by energy use, benefit from the system's high efficiency and reduced waste heat. Moreover, the precision control capabilities allow for consistent temperatures which is generally an important requirement in industries such as food processing, where exact heating conditions ensure product quality, safety, and regulatory compliance. Furthermore, in the context of flexible and modular designs of various sizes for diverse applications, it should be appreciated that one or more heat generating components according to the inventive concepts disclosed herein may be configured as a kit or assembly for retrofitting existing conventional heat generating devices and systems (e.g., conventional boilers) to significantly improve the performance of the conventional devices/systems.

As noted above, heating water with thermal energy is important for various manufacturing processes, where controlled heat application ensures product quality and operational efficiency. Industries such as metalworking, food processing, textiles, and chemicals depend heavily on thermal energy for numerous stages of production. In metalworking, processes such as annealing and quenching require heated water or other fluids to temper and strengthen metals, ensuring durability and resilience. Similarly, the food processing industry relies on heated water for pasteurization, sterilization, and cooking, where precise temperature control is essential to meet food safety standards and maintain product quality. In the textile industry, heated water is used extensively for dyeing and washing fabrics, ensuring that materials retain their color consistency and desired texture. Chemical manufacturing also requires a stable medium for heating, as controlled temperatures are important for facilitating consistent chemical reactions and ensuring high-quality outputs. The Inventors have recognized and appreciated that the inventive system and methods disclosed herein are well-suited all of the foregoing example applications and other applications, as discussed in greater detail below.

With respect to the food processing industry, the heating of water and other fluids is integral to operations requiring pasteurization, sterilization, cooking, blanching, and other temperature-sensitive processes. Thermal heating helps ensure food safety by maintaining the necessary temperatures to eliminate pathogens and spoilage organisms while preserving the food's quality, flavor, and nutritional value. For instance, pasteurization involves heating liquids to specific temperatures to kill harmful bacteria without compromising taste. Similarly, blanching uses heated water to deactivate enzymes in fruits and vegetables, which preserves color and texture during processing and storage. Food processing facilities often face high energy costs due to the intensive heating demands required to maintain consistent temperatures, especially in large-scale operations. The inventive systems and methods disclosed herein are well-suited for multiple aspects of the food-processing industry including, but not limited to, pasteurizing, sterilizing, cooking and blanching.

As noted above, heating water with thermal energy also plays an important role in the chemical and refining industries, where it is used to control catalytic reactions, facilitate separation processes, and manage material extraction. In chemical manufacturing, precise temperature control is an important consideration, as variations can significantly impact reaction rates, product quality, and safety. Heated water provides a stable medium that enables manufacturers to maintain strict temperature parameters required for catalytic reactions and other sensitive processes. In petroleum refining, distillation is a core process that depends on thermal energy. By using heated water or steam, refineries can separate compounds based on their boiling points, effectively isolating valuable hydrocarbons, gases, and other resources. Extraction processes, such as those used in pharmaceutical production or essential oil extraction, also rely on heated water to control solubility and facilitate separation, underscoring the need for consistent and precise temperature regulation. The inventive systems and methods disclosed herein are well-suited for multiple aspects of the chemical and refining industries including, but not limited to, catalytic reactions, separation processes, distillation, and extraction.

Heating water with thermal energy also is valuable in environmental and agricultural contexts. For example, in agriculture, heated water is used to regulate temperatures within greenhouses, promoting optimal conditions for crop growth. Soil conditioning with heated water helps control pathogens and pests, allowing farmers to sterilize soil without relying on chemical interventions. In aquaculture, thermal energy regulates water temperatures essential for fish farming, where precise temperature ranges are important to species health, growth, and production efficiency. Environmental remediation efforts also benefit from heated water applications, where thermal energy aids in separating and neutralizing contaminants such as oil spills or chemical residues. The inventive systems and methods disclosed herein are well-suited for multiple aspects of environmental and agricultural applications including, but not limited to, greenhouse or aquaculture temperature control, soil conditioning, and contaminant remediation.

Thermal energy also is a central component of HVAC (heating, ventilation, and air conditioning) systems and general building infrastructure. Water heating is crucial for hydronic heating systems, such as radiators and underfloor heating, which circulate heated water to provide consistent warmth throughout residential and commercial buildings. These systems are commonly powered by boilers that generate efficient, reliable heat, making them cost-effective for building heating. Recent advancements in boiler technology, including tankless water heaters and heat pumps, have further optimized energy use in HVAC systems. Tankless systems, for example, provide on-demand heating, which reduces energy waste and lowers operational costs. Heat pump technology has also evolved to deliver both heating and cooling by utilizing thermal energy efficiently, and many of these systems are increasingly powered by renewable energy sources. The inventive systems and methods disclosed herein are well-suited for multiple aspects of HVAC and building environmental control.

All combinations of the foregoing concepts and additional concepts discussed in greater detail below (provided such concepts are not mutually inconsistent) are part of the inventive subject matter disclosed herein. In particular, all combinations of subject matter appearing in this disclosure are part of the inventive subject matter disclosed herein. The terminology used herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally and/or structurally similar elements).

FIG. 4A depicts an electrical connector that attaches near an end of the catalytic tube of FIG. 2A.

FIG. 4B depicts an example of a transmission line and contact that can be formed on a PCB used in the electrical connector of FIG. 4A.

DETAILED DESCRIPTION

Following below are more detailed descriptions of various concepts related to, and implementations of, heating systems and methods. It should be appreciated that various concepts introduced above and discussed in greater detail below may be implemented in numerous ways. Examples of specific implementations and applications are provided primarily for illustrative purposes so as to enable those skilled in the art to practice the implementations and alternatives apparent to those skilled in the art.

The figures and example implementations described below are not meant to limit the scope of the present implementations to a single embodiment. Other implementations are possible by way of interchange of some or all of the described or illustrated elements. Moreover, where certain elements of the disclosed example implementations may be partially or fully implemented using known components, in some instances only those portions of such known components that are necessary for an understanding of the present implementations are described, and detailed descriptions of other portions of such known components are omitted so as not to obscure the present implementations.

In the discussion below, various examples of heating systems and methods are provided, wherein a given example showcases one or more particular features in a given context. It should be appreciated that one or more features discussed in connection with a given example may be employed in other examples according to the present disclosure, such that the various features disclosed herein may be readily combined in a given system according to the present disclosure (provided that respective features are not mutually inconsistent).

The Inventors have recognized and appreciated that reactions in catalytic tubes through which a reactant flows can be stimulated by temporally short, wideband electrical pulses. In some cases, the stimulated reactions can efficiently produce heat which can be transferred to a heat-transfer substance that flows in close proximity to and/or in contact with the catalytic tubes. The catalytic tubes can be incorporated into a heating system designed to heat the heat-transfer substance that flows through the system. Such a system can be used, for example, to efficiently produce heated water for commercial and residential heating applications (such as domestic hot water, radiant floor heating, baseboard hot-water heating, radiator hot-water or steam heating, heated swimming pools, saunas, hot tubs, etc.), though heating of other liquids or gases for other applications are also possible. For example, in some cases the stimulated reactions can be hydrogenation reactions that are used to form a substance, such as for the food or chemical industries.

1. HEATING SYSTEM

Figure 1A:
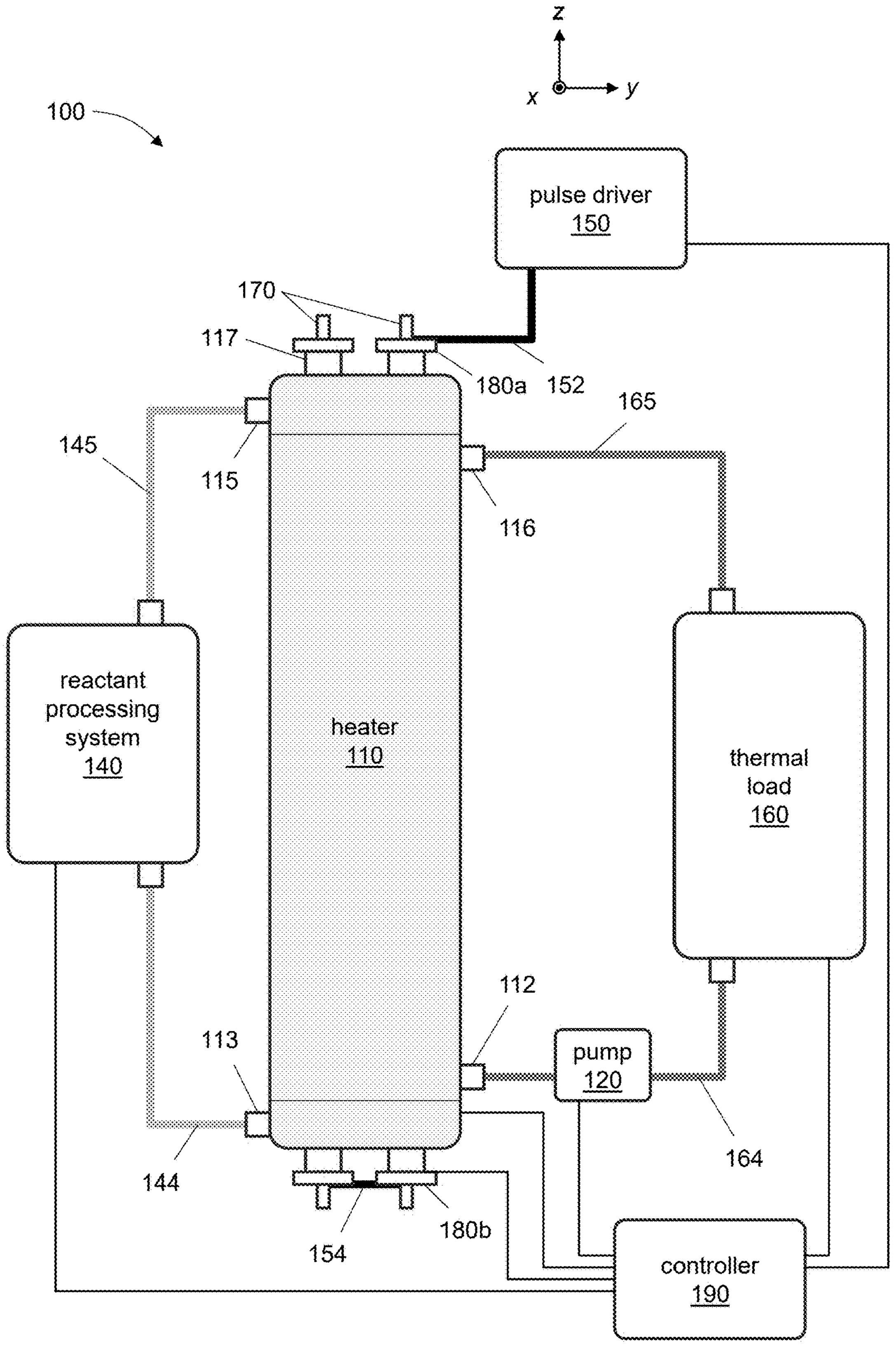
FIG. 1A depicts a heating system that comprises catalytic tubes to heat a liquid and/or gas flowing through the heating system.

FIG. 1A depicts an example of a heating system 100 that comprises a heater 110 having catalytic tubes 170 to heat at least one heat-transfer substance (a fluidic substance such as a liquid and/or gas) flowing through the heater 110. The catalytic tubes 170 extend through the heater 110 and are located within containment tubes 117, which also extend through the heater 110. The illustrated heating system 100 further comprises a pump 120, an electronic pulse driver 150, a reactant processing system 140, and a controller 190. The heat-transfer substance output from the heater 110 can be provided to a thermal load 160. In some implementations, the thermal load 160 can be a hot-water system for a commercial or residential application (e.g., domestic hot water, radiant floor heating, baseboard hot-water heating, radiator hot-water or steam heating, heated swimming pools, saunas, hot tubs, etc.). In such implementations, the heater 110 can heat the water that is distributed by the hot-water system.

The controller 190 can be communicatively coupled, through wireless and/or wired links, to at least one other component in the heating system 100 to implement monitoring and/or control functionality for the heating system 100. The controller 190 can comprise at least one processing device and may comprise a combination of processing devices. Example processing devices that can be used in the controller 190 include, but are not limited to: microprocessor, microcontroller, programmable logic controller (PLC), field-programmable gate array (FPGA), digital signal processor (DSP), application-specific integrated circuit (ASIC), digital logic chips, and transistors. In some cases, the controller 190 can further include discrete electronic components (e.g., resistors, capacitors, inductors, etc.), at least one display element (e.g., light indicator, liquid-crystal display (LCD), an LCD or LED monitor, a touchscreen, etc.), and at least one input element (e.g., a touchscreen, keypad or keyboard, button, switch, etc.). In some implementations, the controller 190 comprises a tablet computer, laptop computer, smartphone, or other packaged computing device. The controller can be co-located with the heating system 100 (e.g., attached to the heater 110), or can be located remotely from the heating apparatus (e.g., communicatively coupled over a network, such as a local area network or wide area network). In some implementations, portions of the controller 190 can be co-located with the heating system 100 and portions of the controller 190 can be located remotely from the heating apparatus.

In the illustration of FIG. 1A, the controller 190 is communicatively coupled to the heater 110, the pump 120, the reactant processing system 140, the pulse driver 150, and the thermal load 160. Each of these communicative couplings can include one or more control lines or channels for issuing control signals to a connected device. Additionally, or alternatively, there can be one or more sense lines or channels to communicatively couple the controller 190 to one or more sensors and one or more of the connected devices (e.g., heater 110, pump 120, reactant processing system 140, and pulse driver 150) in the heating system 100. The sense lines or channels can be used to receive data from the connected sensor or connected device.

The pump 120 can comprise a liquid or gas pump that is operated to circulate a heat-transfer substance through the heater 110 and thermal load 160. The heat-transfer substance can flow out at least one output heat-transfer port 116 from the heater 110 and via at least one output heat-transfer line 165 through the thermal load 160. Cooled heat-transfer substance can return from the thermal load 160 via at least one return heat-transfer line 164 to at least one input heat-transfer port 112 and thus flow back into the heater 110 for reheating and continued circulation. In some cases, one or more output heat-transfer lines 165 and one or more return heat-transfer lines 164 can connect to one or more of the catalytic tubes 170 and to the thermal load 160 for additional heat transfer, as described further below in connection with the catalytic tubes.

The reactant processing system 140 can manage flow of a reactant gas or liquid for the catalytic tubes 170. The reactant processing system 140 can include a reservoir to hold the reactant gas or liquid. The reactant processing system 140 can include at least one pump to circulate the reactant gas or liquid through or over the catalytic tubes 170 and through apparatus within the reactant processing system 140 (such as filters). The reactant processing system 140 can include various apparatus to process the reactant gas or liquid (e.g., one or more filters, gas sensors, pressure regulators, etc.). The reactant gas or liquid can be provided to one or more catalytic tubes 170 in the heater 110 via at least one reactant input line 144 and at least one reactant input port 113 and return to the reactant processing system 140 via at least one reactant output port 115 and at least one reactant return line 145.

The electronic pulse driver 150 is configured to output electrical excitation pulses to at least one catalytic tube 170 in the heater 110. In some implementations, there can be more than one electronic pulse driver 150 per heater 110. For example, each catalytic tube can have a dedicated electronic pulse driver 150 connected to it. The electronic pulse driver 150 is configured to output sequences of temporally short, broad frequency spectrum pulses (also referred to as Q pulses) to excite reactions in the catalytic tubes and thereby cause the generation of heat in the catalytic tubes 170. The electronic pulse driver 150 can be used to turn on and turn off heat generation by the heater 110. Examples of drive circuitry for an electronic pulse driver 150 are described in U.S. Pat. No. 8,624,636 titled "Drive Circuit and Method for Semiconductor Devices," issued Jan. 7, 2014, which patent is herein incorporated by reference in its entirety.

In some implementations, the pulse driver 150 can be configured to produce excitation pulses that each rise quickly from an initial value to a peak value, sustain approximately the peak value for a period of time, and fall back to the initial value. Examples of such pulses are square pulses, though other pulse shapes are possible. The excitation pulses can be output from the pulse driver 150 at a repetition frequency f with a duty cycle D (ratio of the pulse's on time to period T=1/f). The rise time $\tau_r$ of the excitation pulses can be less than approximately or exactly 50 ns (e.g., between approximately or exactly 1 ns and approximately or exactly 50 ns), though shorter rise times can be used in some implementations. The repetition frequency f can be between approximately or exactly 1 kHz and approximately or exactly 500 kHz and the duty cycle D can be between approximately or exactly 0.5% and 50%. The peak amplitude of the excitation pulses can be between approximately or exactly 20 V and approximately or exactly 1000 V.

In some cases, the pulse driver 150 can be configured to produce excitation pulses that each rise to a peak value and fall to an initial value without a sustained duration of the peak value. Examples of such excitation pulses are Gaussian pulses, though other pulse shapes are possible. The temporal full-width-half-maximum value $\tau_0$ of the excitation pulses can be less than approximately or exactly 200 ns (e.g., between approximately or exactly 1 ns and approximately or exactly 200 ns), though shorter excitation pulses can be used in some implementations. The repetition frequency f can be between approximately or exactly 1 kHz and approximately or exactly 500 kHz and the duty cycle D can be between approximately or exactly 0.5% and 50%. The peak amplitude of the excitation pulses can be between approximately or exactly 50 V and approximately or exactly 1000 V.

The Inventor has recognized and appreciated that the application of pulses to the transmission line of the catalytic tube 170 can produce phonons in the lattice of the catalyst material. These phonons shake the lattice and can trigger heat-producing reactions catalyzed by the lattice material. More abrupt rise times and/or shorter pulse durations of the applied electrical pulses comprise a broader band of frequencies that can excite the lattice and increase reactivity of the catalytic tube 170.

The electrical pulses from the electronic pulse driver 150 can be applied to the catalytic tubes 170 via transmission lines 152, 154, which can be implemented as radio-frequency (RF) coaxial cables. In some cases, the transmission lines 152, 154 can connect to printed circuit boards (PCB) 180*a*, 180*b* (also referred to as "coupling PCB 180*a*, 180*b*" or more generally as "coupling PCB 180") which in turn electrically couple to the catalytic tubes 170. According to some implementations, as illustrated in FIG. 1A, the electronic excitation pulses can be applied via a first transmission line 152 to an end of a first one of the catalytic tubes 170, travel down the first catalytic tube to an opposing end and then be applied via a second transmission line 154 to an end of a second one of the catalytic tubes 170. In this manner, the electronic excitation pulses can be applied to all of the catalytic tubes 170 (which are connected in series) in the heater 110. In some cases, the pulse driver 150 can output pulses for exciting reactions in at least two catalytic tubes 170 that are connected in series (e.g., from 2 to 8, from 5 to 20, or more than 20). In some cases, the pulse driver 150 can provide excitation pulses to more than 8 catalytic tubes 170 that are connected in series. In some implementations, the pulse driver 150 can provide excitation pulses to multiple catalytic tubes 170 that are connected in parallel (e.g., from 2 to 8, from 5 to 20, or more than 20).

Figure 1B:
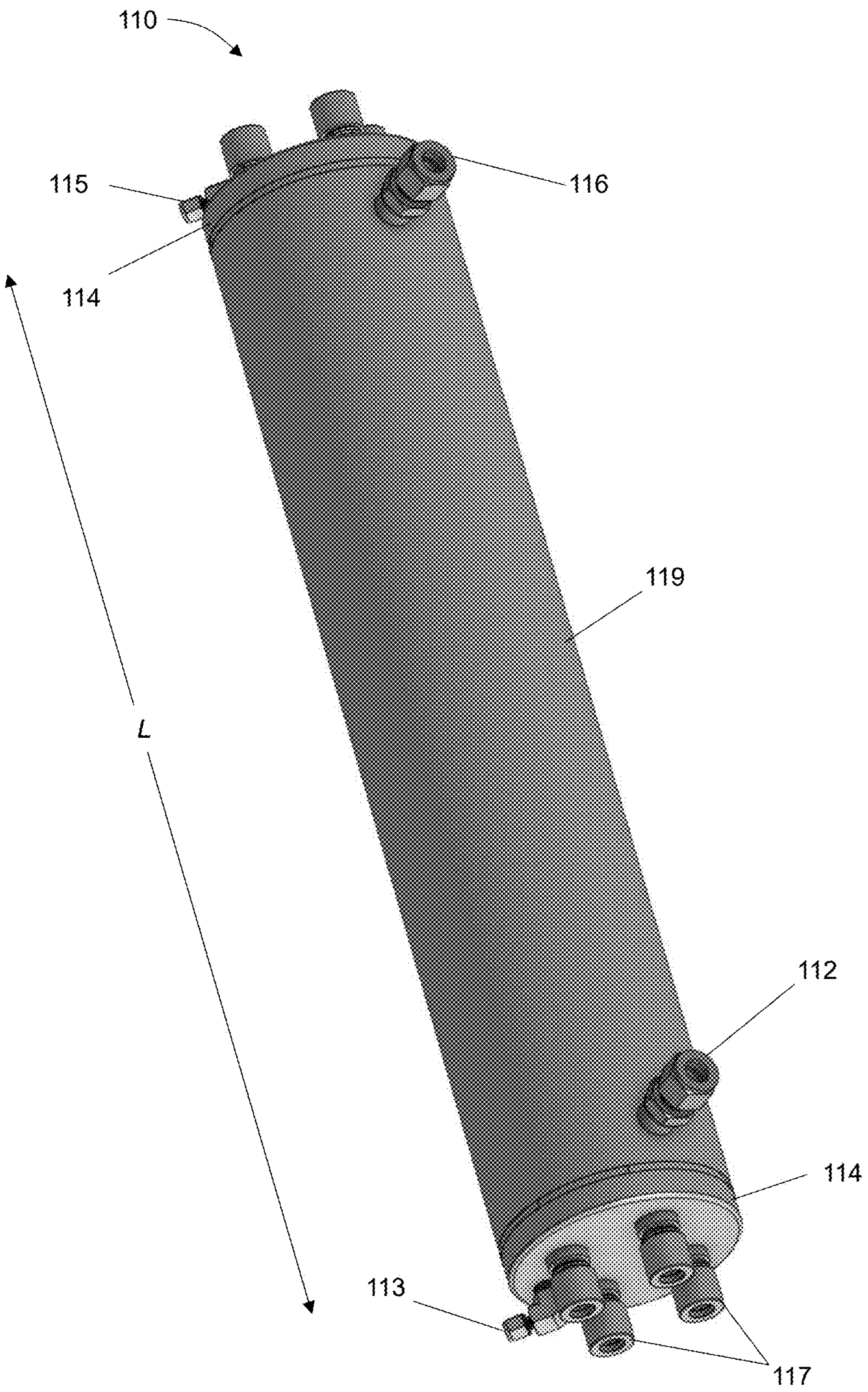
FIG. 1B depicts, in perspective view, an example of a heater that can be used in the heating system of FIG. 1A.

FIG. 1B illustrates, in perspective view, an example of a heater 110 that can be used in the heating system of FIG. 1A. The heater is tipped to show an end of the heater 110. There are four containment tubes 117 extending from each end of the heater 110 which can house four catalytic tubes 170 (not shown in FIG. 1B), though a heater 110 can have fewer or more containment tubes 117 than shown in the drawing. The heater comprises an outer shell 119 and feed-thru manifolds 114 located at each end of the heater 110. To reduce heat loss to the external environment and increase an amount of heat coupled to heat-transfer liquid or gas flowing through the heater, the heater 110 can be wrapped in insulation and/or heat-reflective material and covered with a thin layer of sheet metal, polymer, or other material (not shown in the drawing) in an arrangement similar to household hot water heaters. The length L of the heater 110 can be from 50 cm to 200 cm, though shorter or longer heaters can be implemented.

2. CATALYTIC TUBES

Figure 2A:
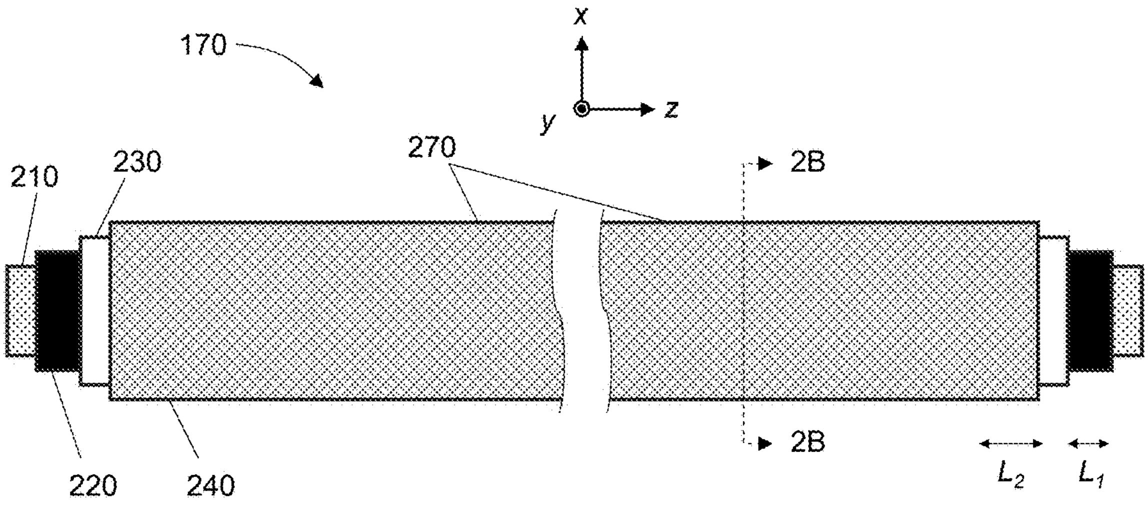
FIG. 2A depicts an example of a catalytic tube that includes a reactive transmission line and that can be used in the heating system of FIG. 1A.
Figure 2B:
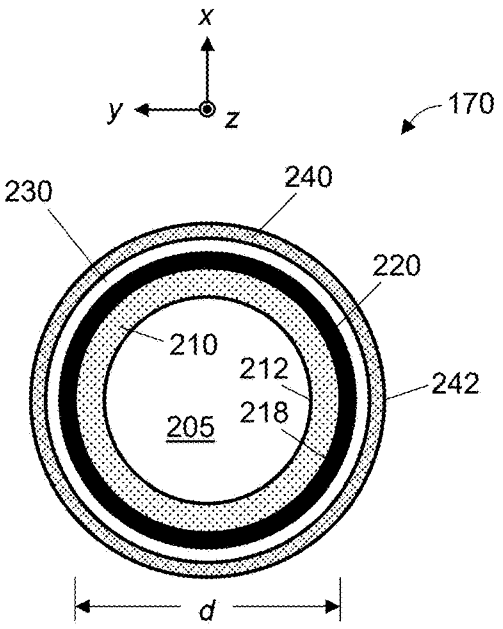
FIG. 2B illustrates a cross-section of the catalytic tube of FIG. 2A.

FIG. 2A and FIG. 2B depict an example of a catalytic tube 170 that can be used in the heating system of FIG. 1A. FIG. 2B illustrates a cross-section (taken at the dashed line) of the catalytic tube 170 of FIG. 2A. In this illustrated implementation, the catalytic tube 170 comprises a support 210 and several layers of material deposited on the support. The support 210 can be formed from an electrically conductive or non-conductive material that is able to withstand temperatures of up to 800° C. without permanently deforming or being damaged. The layers deposited on the support 210 can include, but are not limited to, an electrically-conductive layer 220, an electrically-insulating layer 230 disposed on the electrically-conductive layer 220, and an electrically-conductive, reactive layer 240 disposed on the electrically-insulating layer 230. In some implementations, a second electrically-insulating layer can be deposited between the support 210 and the electrically-conductive layer 220, to increase electrical and/or thermal isolation of the support 210 from the outer layers.

The phrase "disposed on" can mean that a second layer physically contacts an underlying first layer (e.g., is physically deposited on and is in intimate contact with the underlying first layer). The phrase "disposed on" also can mean that a second layer is disposed over the underlying first layer with at least one in intervening layer between the first layer and second layer.

The support 210 can be a cylindrical tube or have another shape (e.g., a square tube, rectangular tube, polygonal tube, or elliptical tube). The support 210 can extend at least the length L of the heater and can further extend beyond each end of the heater 110 when installed in a containment tube 117 of the heater 110. The support 210 can have an interior wall 212 surrounding a hollow core 205. In other implementations, the support 210 may not have a hollow core and instead be solid or porous at its interior region. When the support 210 has a porous or hollow core 205, a heat-transfer substance (e.g., a liquid or gas) can be circulated through the hollow core 205 and through a thermal load 160 with additional fluidic connections between the catalytic tubes 170, the thermal load 160. The heat-transfer substance can be circulated with the same pump 120 or an additional pump.

According to some implementations, the support 210 is formed from a metal (e.g., stainless steel). Other materials that can be used to make the support 210 include, but are not limited to, invar, Zerodur®, a ceramic, alumina, fused silica or other glass, zirconia, and sapphire. In some implementations, the outer diameter d or maximum transverse dimension of the support 210 or catalytic tube 170 can be between approximately or exactly 2.5 mm and approximately or exactly 12 mm, though larger diameters may be used in some cases.

Having a small diameter can be beneficial for obtaining a high peak current density (about 2 $kA/mm^2$) in the reactive layer 240 for a pulse driver 150 operating with voltages below 1000 volts. For some applications, the peak current density driven in the reactive layer 240 by the pulse driver 150 is between approximately or exactly $1.5\times10^3$ $A/mm^2$ and $3\times10^3$ $A/mm^2$. For a pulse driver 150 operating at higher voltages and/or supplying higher currents, the support 210 can have larger diameters or transverse dimensions (e.g., up to 25 mm or even larger). The length of the support 210 (along the z direction in the drawings) can be between approximately or exactly 40 cm and approximately or exactly 220 cm. With smaller diameters, more than four containment tubes 117 (and catalytic tubes 170 installed therein) can be mounted in the heater 110 to increase heat output. For example, up to 100 containment tubes 117 and catalytic tubes 170 could be assembled into a heater 110.

Figure 2C:
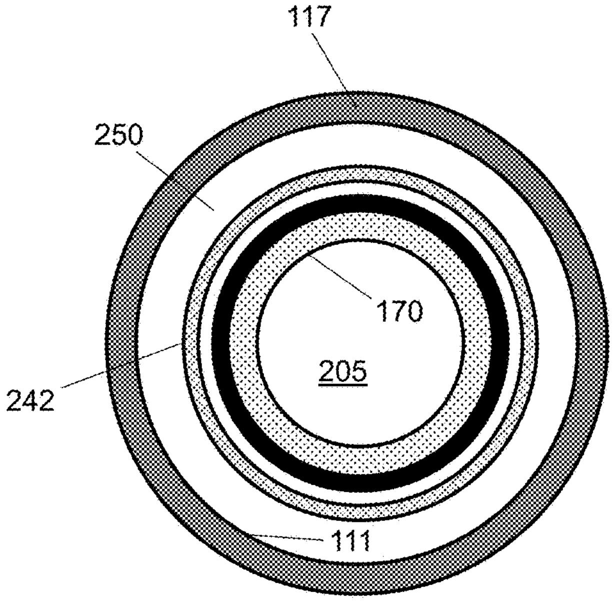
FIG. 2C depicts, in cross-section, the catalytic tube of FIG. 2B installed within a containment tube.

FIG. 2C depicts a cross-section of the catalytic tube 170 of FIG. 2B installed within the containment tube 117. An annular reactant space 250 exists between the outer surface 242 of the catalytic tube 170 and in inner surface 111 of the containment tube 117. A reactant gas or liquid can flow along the catalytic tube 170 in a sheath over the outer surface 242 and contact the outer surface of the catalytic tube. In this illustrated implementation, the flowing reactant can contact the electrically-conductive, reactive layer 240 of the catalytic tube 170.

For some materials, such as stainless steel, the support 210 and catalytic tube 170 of FIG. 2A may undesirably sag when operating at temperatures up to 800° C. (e.g., when the catalytic tube is mounted such that its length is oriented horizontally in a heater installation). To prevent sag, the annular reactant space 250 between the reactive layer 240 of the catalytic tube 170 and the inner wall of the containment tube 117 (when the catalytic tube 170 is installed inside the containment tube 117) can be packed with a porous, thermally-conductive fill material, such as alumina. The containment tube 117 can then provide additional support to the catalytic tube 170. The porous material can still allow flow of the reactant within the annular reactant space 250.

In other implementations, the structure of the catalytic tube can be different than that shown. In one example, the structure of the catalytic tube is reversed from that shown in FIG. 2B, such that the support tube is located on the outside of the catalytic tube 170 and the layers are deposited on the interior of the outer support such that the electrically-conductive, reactive layer is in inner most layer adjacent to the hollow core 205. In this implementation, the reactant can flow through the hollow core 205. The containment tube 117 can be omitted from the heater 110 in such an implementation so that the heat-transfer substance contacts the outer support tube.

Figure 2D:
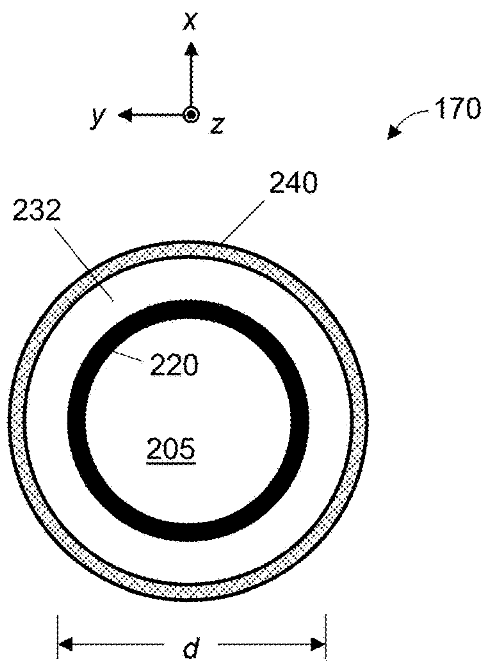
FIG. 2D depicts another implementation of a reactive transmission line structure and catalytic tube that can be used in the heater of FIG. 1A.

In another example, illustrated in FIG. 2D, an insulating tube (such as a fused quartz tube) 232 can be used to provide support for the catalytic tube 170, provide electrical isolation between the conductive layers, and form the reactive transmission line with the electrically-conductive layer 220 and electrically-conductive, reactive layer 240. The containment tube 117 can be included in the heater 110 if the electrically-conductive, reactive layer 240 is located on the outside of the catalytic tube 170, as illustrated. Alternatively, the containment tube 117 can be omitted from the heater 110 if the electrically-conductive, reactive layer 240 is located on the inside of the catalytic tube 170 (an order of layers reversed from the order shown in FIG. 2D).

Because of high-temperature operation, it is desirable to use a material for the support that has a very low coefficient of thermal expansion (CTE) or one that approximately matches a CTE for at least one layer, or for the combination of layers, deposited on the support 210. For example, the CTE of the support 210 can approximately match a CTE for at least one of, or the combination of, the electrically-conductive layer 220, the electrically-insulating layer 230, and the electrically-conductive, reactive layer 240. Differences in CTE values between the support 210 and layers may limit the length of the catalytic tubes 170 (e.g., due to cracking and/or delamination of the layers deposited on the support 210). For lower temperature operation (e.g., in domestic water heaters where the catalytic tubes 170 may operate at temperatures no greater than about 200° C.) design considerations relating to either or both of catalytic tube sag (described above) and differences in CTE values can be more relaxed. For example, larger CTE differences may be tolerated and/or a support 210 that may sag at 800° C. may operate fine at 200° C. without sagging.

For one example implementation, the support 210 is formed from alumina (CTE: $8.1\times10^{-6}$/° C.) or austenitic stainless steel (CTE: $17.3\times10^{-6}$/° C.), the electrically-conductive layer 220 is formed from copper (CTE: ~$16.4\times10^{-6}$/° C.), the electrically-insulating layer 230 is formed from alumina, and the electrically-conductive, reactive layer 240 is formed from nickel (CTE: $13\times10^{-6}$/° C.). Other material combinations are possible.

Referring again to FIG. 2B, the outer surface 218 of the support 210 (over at least a region on which the outer layers are deposited) can be machined and/or polished smooth so that subsequent layers deposited on the outer surface 218 will be smooth. The electrically-conductive layer 220, the electrically-insulating layer 230, and the electrically-conductive, reactive layer 240 can form a transmission line 270 suitable for propagating electrical excitation pulses (delivered by the electronic pulse driver 150) along the catalytic tube 170 which stimulate a catalytic reaction with the reactant gas or liquid that contacts the electrically-conductive, reactive layer 240 of the transmission line 270. Such a transmission line may be referred to as a "reactive transmission line" or "catalyzing transmission line." When the support 210 is cylindrical, the transmission line 270 formed by the three outer layers is a coaxial transmission line, though other transmission line shapes can be used in other implementations. A smooth outer surface 218 of the support and of the electrically-insulating layer 230 can improve transmission line performance (e.g., reduce dispersion of excitation pulses propagating along the catalytic tube). A smooth and dense outer surface of the electrically-insulating layer can also reduce the dispersion of phonons generated in the electrically-conductive, reactive layer 240 and increase the reflection of phonons emanating from the electrically-conductive, reactive layer 240 back into the electrically-conductive, reactive layer 240 to improve catalytic reactions in the layer. In some implementations, the RMS roughness of the outer surface 218 can be between approximately or exactly 0.1 micron and approximately or exactly 1 micron, or between approximately or exactly 0.05 micron and approximately or exactly 0.5 micron. Preferably, the short pulse shape and high peak intensity should be maintained as the excitation pulse propagates along the catalytic tube(s) 170.

By making the outer surface 218 of the support 210 smooth, the deposited electrically-conductive layer 220 can be smooth to help reduce dispersion of excitation pulses propagating along the catalytic tube 170. The thickness of the electrically-conductive layer 220 can be between approximately or exactly 1 micron and approximately or exactly 500 microns, though thinner or thicker values may be used in some cases. The electrically-conductive layer 220 can be deposited by a physical deposition process (e.g., a plasma spray deposition or chemical vapor deposition) and/or by a plating process (e.g., electrochemically plated onto the support 210). According to some implementations, the electrically-conductive layer 220 is formed using multiple steps. First, the selected material (e.g., copper) is spray deposited in a reduction atmosphere to improve adhesion to the support 210. The spray deposition also can provide a porous morphology of the deposited layer to help accommodate differences in CTEs between the deposited layer and the support 210. In a next step, the same conductive material or a different conductive material can be plated onto the spray-deposited material to form a smooth skin through which electrical current will flow (driven by the pulse driver 150) when the system is in operation.

The electrically-insulating layer 230 can comprise a dielectric material, such as alumina, yttrium stabilized zirconia, or other dielectric material. Preferably, the dielectric material can withstand high temperatures (e.g., up to 800° C.) without incurring an appreciable change (e.g., more than 5%) in the dielectric constant or permittivity of the dielectric material. Alumina can withstand such high temperatures and maintain its dielectric constant to within about 5% between room temperature and high temperature operation up to 800° C. The electrically-insulating layer 230 can be spray coated in particulate form onto the electrically-conductive layer 220. The spray deposition can provide some porosity of the deposited layer (to accommodate differences in CTE values between the electrically-insulating layer 230 and adjacent layers. The thickness of the electrically-insulating layer 230 can be between approximately or exactly 100 microns and approximately or exactly 400 microns, though thinner or thicker values may be used in some cases.

The reactive layer 240 can be deposited onto the electrically-insulating layer 230 using a physical deposition process (e.g., sputtering, plasma spray deposition, chemical vapor deposition, application of a powder form of the material and sintering) and/or an electroplating process. This outer layer comprises a reactive layer where heat is generated during operation of the heater. The material for the reactive layer 240 is chosen to catalyze a reaction with the reactant substance that contacts the reactive layer 240. In some implementations, atoms of the reactant substance (such as hydrogen atoms or deuterium atoms) can enter and diffuse into the lattice of the reactive layer 240. Example materials for the reactive layer 240 include, but are not limited to, nickel (Ni), copper (Cu), palladium (Pd), platinum (Pt), rhodium (Rd), titanium (Ti), tungsten (W), cobalt (Co), iron (Fe), any transition metal that can absorb hydrogen, or some combination these materials formed in an alloy and/or multilayer structure. In some implementations, the reactive layer 240 can be formed as a multilayer structure (e.g., a thin, micron or sub-micron thick layer of Pd deposited over Ni). Such a multilayer structure may improve absorption of hydrogen into nickel.

In an exemplary implementation, Ni used. Nickel has several desirable features which include low cost and suitability for physical deposition processes. Another desirable feature of Ni is that absorption of hydrogen within the material increases when the temperature of the material increases, which is an opposite trait than absorption of hydrogen in Pd. In some implementations, the deposited nickel can be treated to form a porous or so-called "grainy nickel" which can provide a more reactive surface and facilitate ingress of atoms from the reactant substance into the reactive layer 240.

The thickness of the reactive layer 240 can be between approximately or exactly 200 micron and approximately or exactly 900 microns, though thicker values may be used in some cases. The reactive layer 240 can be deposited to a thickness that is sufficient to dissipate heat generated from catalyzed reactions within the layer without damage to the layer. As such, the thickness of the reactive layer 240 may be selected based on a peak temperature expected for a particular application. An application for producing domestic hot water or for a hydrogenation process may operate at a lower temperature than an application for heating systems to heat a residential or commercial building and therefore have catalytic tubes 170 with thinner reactive layers (e.g., no greater than 200 microns).

Figure 2E:
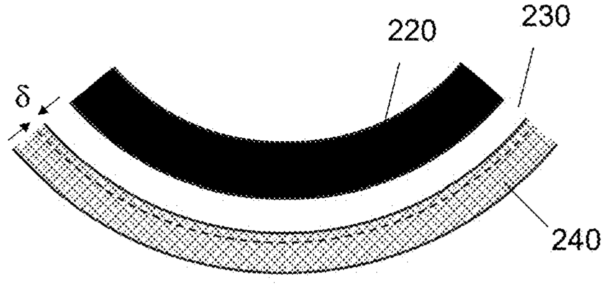
FIG. 2E illustrates a portion of the catalytic tube of FIG. 2B in finer detail.

A countervailing consideration for the thickness of the reactive layer 240 is diffusion of atoms from the reactant gas or liquid into the reactive layer. Preferably, the reactive layer 240 is thin enough so that a sufficient supply of atoms (e.g., hydrogen atoms) can diffuse into the reactive layer 240 to an active portion of the reactive layer. During operation of the heating system 100, the reactive layer 240 is exposed to both the reactant which flows across the outer surface of the reactive layer 240 due to the reactant processing system 140 and to electrical current from broad-spectrum excitation pulses delivered by the electronic pulse driver 150. Because of the skin effect, the current flowing through the reactive layer 240 can be confined within a short distance & from the interface between the electrically-insulating layer 230 and the reactive layer 240, as depicted in FIG. 2E. This short distance 8 is a region within which catalyzed reactions can be highest and is part of the active portion of the reactive layer 240.

The distance 8, known as the skin depth, is determined in part by the frequency (or frequency spectrum) of the excitation pulse driven along the transmission line 270 by the pulse driver 150 and the resistivity of the material used to form the reactive layer 240. Both the frequency spectrum and resistivity can be tailored, to some extent, during design and/or operation of the system. For example, the excitation pulse duration can be tailored during design of the pulse driver 150 and may be adjustable by a user during operation of the system in some implementations of the pulse driver. The pulse amplitude (and therefore pulse energy and average power in a train of pulses) may also be adjustable by a user during operation of the system. The resistivity of the reactive layer 240 can be tailored by alloying metals and/or by selecting or adjusting deposition processes during design and manufacture of the catalytic tubes 170, for example.

To obtain uniform layer thicknesses for each of the three layers 220, 230, 240 during a physical deposition process, the support 210 can be rotated (about its central axis along the z direction) and may further be translated within a deposition chamber.

During operation of the system, most of the current from the excitation pulses provided by the pulse driver 150 flows within the region bound by the skin depth 8. In this region, the driven current can excite phonons in the reactive layer 240. The phonons can propagate throughout the reactive layer 240 dissipating energy to the lattice as they propagate. These phonons have their highest energy in the region of the reactive layer 240 bound by the skin depth and they aid in stimulating reactions of the reactant gas or liquid catalyzed by the reactive layer 240. The active portion of the reactive layer 240 can extend beyond the skin depth since phonons can propagate beyond the skin depth. The catalyzed reactions produce heat in the reactive layer 240 that, in part, radiates outward to the surrounding containment tube 117 where the heat can thermally couple to the heat-transfer substance in the heater 110.

At the ends of the catalytic tube 170, along portions of the catalytic tube that extends outside the heater shell 119, the electrically-conductive layer 220 can be exposed along a first length $L_1$ of the support 210 (in the ±z directions of the drawing for FIG. 2A), so that an electrical connection can be made to the electrically-conductive layer 220. Similarly, the reactive layer 240 can also be exposed along at least a second length L2 of the support 210 so that an electrical connection can be made to that layer. The electrically-insulating layer 230 may or may not be exposed along a length of the support 210.

Figure 2F:
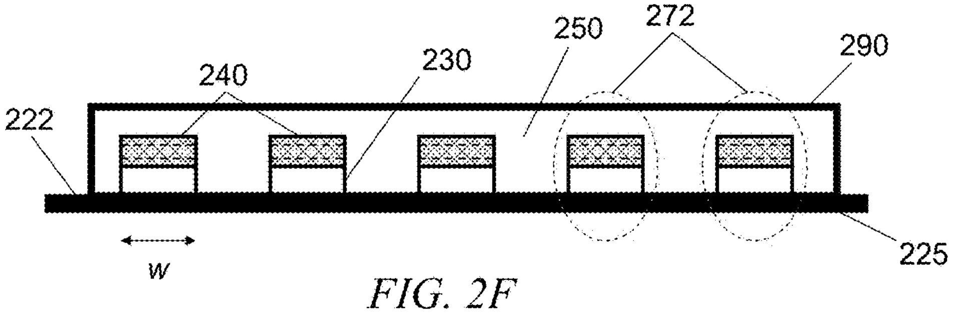
FIG. 2F depicts another catalytic structure comprising reactive transmission lines that can be used in the heater of FIG. 1A.

Other implementations of a catalytic structure are also possible, and a tube shape is not necessarily required. In some cases, the catalytic structure can be implemented as a planar transmission line, or as a plurality of strip transmission lines running in parallel. FIG. 2F depicts an example of a catalytic structure that comprises a plurality of strip transmission lines 272 that can run in parallel along a substrate 222. The assembly can extend through the heater 110. The substrate could be a metal substrate (e.g., copper) which can provide a ground plane and thermal coupling to a heat-transfer substance flowing through the heater 110. The heat-transfer substance may or may not contact a back surface 225 of the substrate. The strip transmission lines 272 can be patterned on the substrate using planar fabrication processes (e.g., depositing the electrically-insulating layer 230, depositing the reactive layer 240, patterning and etching the strip transmission lines 272). The width of each strip transmission line 272 can be between 0.2 mm and 4 mm. In some implementations, the strip transmission lines 272 can be enclosed by a cover 290 to form a reactant space 250 through which the reactant can flow. The cover 290 may or may not be electrically conductive.

In some cases, the cover 290 can be a conductive metal (e.g., copper) that electrically connects to a conductive substrate 222 to provide a ground reference all around the strips formed from the reactive layer 240. With a ground reference all around the strips and approximately equal distances from the strips, the skin effect (indicated by the dashed lines) can occur on both sides of the strips. The added skin effect on the upper surfaces of the strips formed from the reactive layer provide a shorter path for reactant atoms to enter into active regions of the reactive layer 240. The conductive cover 290 can also provide thermal coupling to a heat-transfer substance, which may or may not contact the exterior of the conductive cover 290.

3. FEED-THRU AND SUPPORT OF CATALYTIC TUBES

Figure 3A:
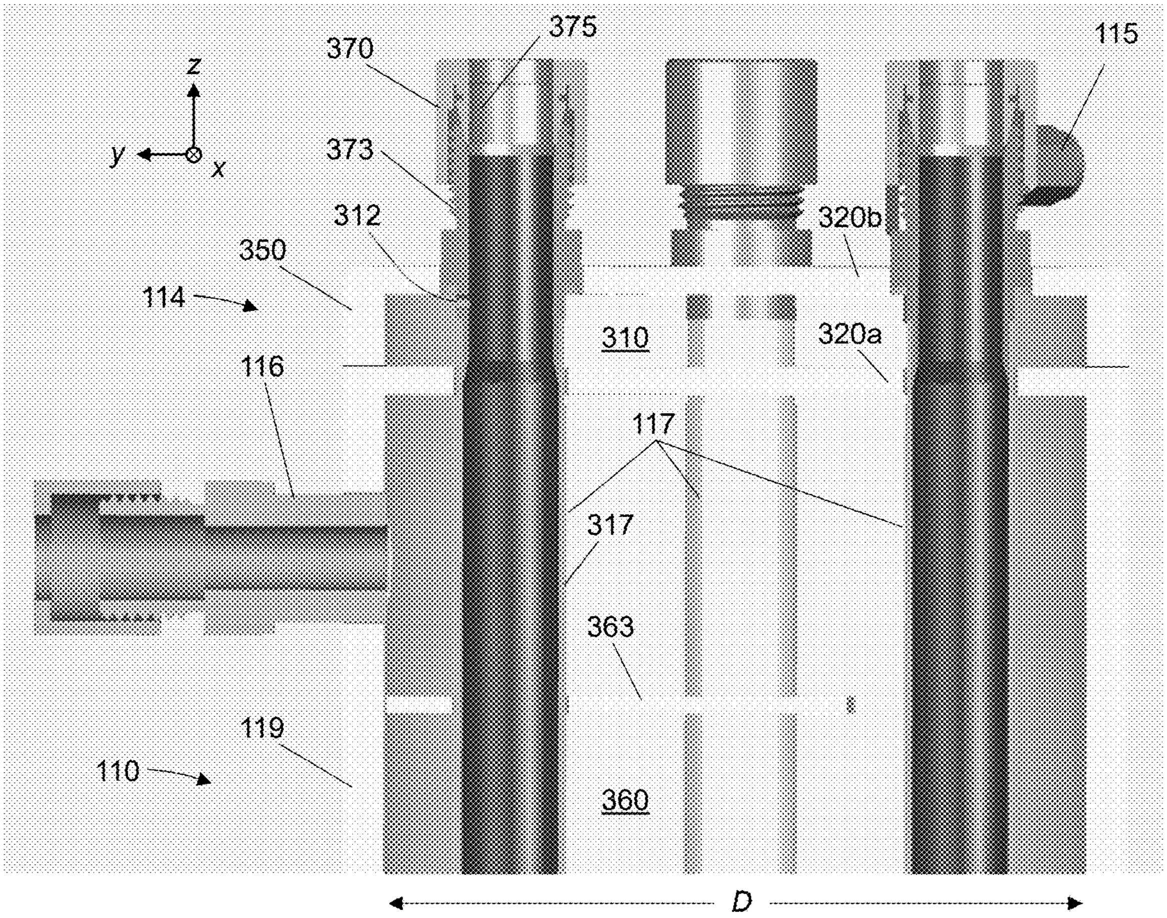
FIG. 3A depicts further details of a portion of the heating system of FIG. 1A where the catalytic tube passes through an end of the heater.

FIG. 3A depicts, in a cross-sectional view, further details of a portion of the heating system of FIG. 1A where the containment tube 117 passes through a feed-thru manifold 114 located at one end of the heater 110. Visible in the drawing are an output heat-transfer port 116 and a reactant output port 115 (located behind one of the containment tubes 117). The cross-section passes centrally through the output heat-transfer port 116, the heater 110, and two of the containment tubes 117. The feed-thru structure supports the containment tubes 117, which each house and support a catalytic tube 170 (not installed in the drawing of FIG. 3A).

The feed-thru manifold 114 comprises a manifold chamber 310 to contain and distribute the reactant to each containment tube 117. The reactant can enter each containment tube 117 through a hole 312 in the sidewall of the containment tube within the manifold chamber 310. The reactant can then travel along a sheath or reactant space 250 (FIG. 2C) between an inner wall of the containment tube 117 and the reactive layer 240 on the outer surface of the catalytic tube 170 (which is installed within the containment tube 117 when the system is operating). The reactant gas or liquid can exit a similar hole 312 in the sidewall of the containment tube 117 within the second feed-thru manifold 114 at an opposite end of the heater 110 (not shown in FIG. 3A).

Though the manifolds 114 and support structure for the containment tubes 117 are integrated together and attached to the end of the heater 110 in the example heater, the gas manifold structure could be located elsewhere outside the heater. For example, a gas manifold could be mounted apart from the heater and individual gas lines can run from the manifold to each containment tube 117. In such implementations, the support structure for the containment tubes 117 could be located on end walls of the heater chamber 360.

For the example implementation of FIG. 3A, the containment tubes 117 pass through and are sealed to end walls 320*a*, 320*b* of the heater 110 and the feed-thru manifold 114, respectively so that the manifold chamber 310 is airtight. The end wall 320*a* of the heater 110 can be part of the outer shell 119 for the heater 110. Sealing of the containment tubes 117 to the end walls 320*a*, 320*b* can be done using high temperature adhesives, solder, brazing, welding, Teflon® or silicone O-rings, or some combination thereof, for example. The containment tubes 117 can be formed from stainless steel, for example. Other materials that can be used to form the containment tubes include aluminum, copper, bronze, brass, metal alloys comprising one or more of the preceding materials, galvanized steel, steel coated to resist corrosion.

The feed-thru manifold 114 can be formed, according to some implementations, by attaching a cup-shaped end-piece 350 to an end of the outer shell 119. The attachment of the end-piece 350 can be done by fasteners (along with a gasket or O-ring) or by an adhesive, solder, brazing, or welding, for example. Prior to attaching the end-piece 350, the containment tubes 117 can be installed in the heater 110 and sealed to the end walls 320*a* of the heater. The material used to make the feed-thru manifold 114 and the outer shell 119 can comprise stainless steel and/or other materials such as aluminum, copper, bronze, brass, metal alloys comprising one or more of the preceding materials, galvanized steel, steel coated to resist corrosion.

According to some implementations, the containment tube 117 comprises a tubular portion 317 and an insert 373. A portion of the insert 373 fits within the tubular portion (located inside the manifold chamber 310 in the example implementation). The fit of the insert 373 can be a press fit or friction fit to aid in sealing the two pieces together. In some cases, the insert 373 can be soldered, brazed, or welded to the tubular portion 317. Since the joint between the insert 373 and tubular portion can be located within the manifold chamber 310, a leak at the joint would not affect system operation appreciably. During assembly of the feed-thru manifold 114, the tubular portion 317 can be installed in the heater chamber 360 and sealed to end walls 320*a* of the heater 110 to prevent influx of heat-transfer substance in the heater chamber 360 into the containment tube 117. The inserts 373 can then be installed in the tubular portions 317 and the end-piece 350 attached. The inserts 373 can then be sealed to the end wall 320*b* of the feed-thru manifold 114.

Figure 3B:
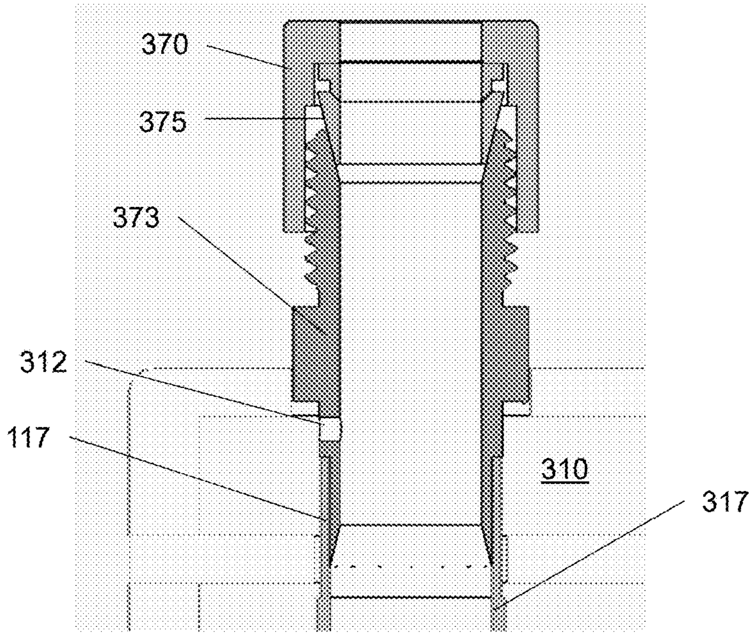
FIG. 3B illustrates an expanded cross-sectional view of a portion of FIG. 3A showing various components at one end of a tubular portion of a containment tube of the heater shown in FIG. 3A.

The inserts 373 can be threaded at one end, similar to a Swagelok® fitting. A nut 370 can thread onto the insert 373 and engage (press on) a ferule 375 when tightened onto the insert 373. The ferule 375 can close inward, grabbing and supporting the catalytic tube 170 within the containment tube 117. The nut 370 and ferule 375 can facilitate installation and replacement of the catalytic tube 170. FIG. 3B illustrates an expanded cross-sectional view of the insert 373 inserted into one end of the tubular portion 317 of the containment tube 117, together with the nut 370 and the ferule 375.

In some cases, the ferule 375 can seal the gas chamber formed as an annular reactant space 250 (FIG. 2A) between the catalytic tube 170 (when installed within the containment tube) and the containment tube 117. In other cases, an O-ring can be installed between the catalytic tube 170 and containment tube 117 at each end of the catalytic tube 170 to form a sealed gas chamber comprising an annular reactant space 250 around the catalytic tube 170. In some implementations, an insulating sleeve (not shown) can be placed over the catalytic tube 170, so that the sleeve is located between the catalytic tube 170 and the ferule 375. The insulating sleeve can provide electrical isolation of the reactive layer 240 from the containment tube 117 and also assist in forming a gas-tight seal at the ends of the containment tube 117. In some cases, the ferule 375 can be formed from an electrically insulating material (such as Teflon® or silicone rubber) to electrically isolate the catalytic tube 170 and its transmission line 270 from other metals in the heater 110. Because the ferule 375 can be formed from a polymer, it can grip the catalytic tube 170 without deforming the tube to facilitate removal and replacement of the catalytic tube 170.

Figure 3C:
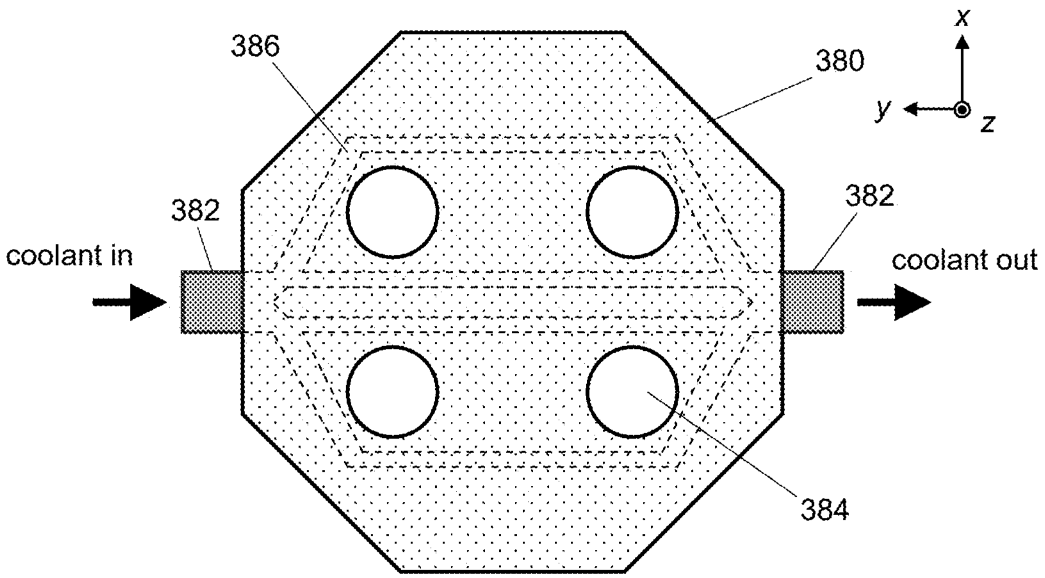
FIG. 3C depicts an example of a cooling plate that can cool components at the ends of the containment tubes of FIG. 3A.

According to some implementations, the nuts 370 at the ends of the heater 110 can be cooled by an external cooling loop to reduce degradation of the ferules 375 that are engaged by the nuts 370. FIG. 3C depicts an example of a cooling plate 380 that can cool components at the ends of the catalytic tubes when inserted into the containment tubes 117 of FIG. 3A and during operation of the heater 110. The cooling plate 380 can be of any shape and be formed from a high-thermal-conductivity material such as copper, an alloy of copper, aluminum, an alloy of aluminum, or a ceramic. The cooling plate 380 can include one or more recesses or openings 384 formed in the cooling plate 380. The recesses or openings 384 can be sized and located to fit over the nuts 370 at the ends of the catalytic tubes 170. In some implementations, the nuts 370 can be cylindrical in shape so that the recesses or openings 384 can be cylindrical. A thermally conductive material (e.g., a thermal grease or gel, indium foil, etc.) can be installed between the cooling plate 380 and the nuts 370 to improve the flow of heat from the nuts 370 to the cooling plate 380. The cooling plate 380 can further comprise one or more channels 386 formed within the cooling plate to convey coolant liquid through the plate and in close proximity (e.g., within 5 mm) to the recesses or openings 384. The channels 386 can be formed by milling partial channels into halves of the cooling plate 380 and bonding the halves together or by drilling holes into the cooling plate and sealing some ends of the holes. The cooling plate 380 can further comprise ports 382 fluidically coupled to the channels 386 for connecting the cooling plate 380 to a fluid circuit that carries coolant liquid to and from the cooling plate 380.

With reference again to FIG. 3A, the heater 110 further comprises a heater chamber 360 through which a heat-transfer liquid or gas can flow. The heat-transfer substance comes into contact with the containment tubes 117 which receive heat from catalytic tubes 170 (not shown in FIG. 3A) that are installed within the containment tubes 117 when the system is operating. The heater chamber 360 can include a plurality of baffles 363 located throughout the heater chamber 360 to aid in mixing the heat-transfer liquid or gas as it flows through the heater chamber 360. The heat-transfer liquid or gas enters the heater chamber 360 through the one or more input heat-transfer ports 112 and flows out the one or more output heat-transfer ports 116. The inner diameter D of the heater chamber can be between approximately or exactly 10 cm and approximately or exactly 80 cm, though larger diameters are possible to scale heat production. With larger diameters, more containment tubes 117 and catalytic tubes 170 can be installed in the heater 110, increasing its thermal output.

4. ELECTRICAL CONNECTIONS TO THE CATALYTIC TUBES

FIG. 4A depicts details of an electrical connector 400 that can attach near an end of the catalytic tube 170 of FIG. 2A when the tube is installed in the heater 110 of FIG. 1A. The illustration is a cross-section taken through the catalytic tube 170 and electrical connector 400. The electrical connector 400 is used to make electrical connections to the electrically-conductive layer 220 and the reactive layer 240 which form the transmission line 270 along the catalytic tube 170. The electrical connector 400 comprises a clamp 405 and a coupling PCB 180*a* (or coupling PCB 180*b*) retained within the clamp 405. The electrical connector 400 is one example of apparatus that can be used to make the electrical connections to the transmission line 270. Other structures of apparatus to make the electrical connections to the transmission line 270 are also possible.

The clamp 405 comprises at least two clamping plates located on opposites sides of the coupling PCB 180. A first clamping plate 410 can be located on a first side of the coupling PCB 180 and can be configured to press on a first collet 415 when drawn toward a second clamping plate 420. The second clamping plate 420 can be located on a second, opposing side of the coupling PCB 180 and be configured to press on a second collet 425 when the second clamping plate 420 is drawn toward the first clamping plate 410. The clamp 405 can further comprise a backing plate 430, which may or may not be electrically conducting. The backing plate 430 can have threaded holes 462 to engage the screws 460 and draw the first clamping plate 410, PCB 180, and second clamping plate 420 toward the backing plate. The first clamping plate 410 and the second clamping plate 420 can be formed from a non-conducting material, such as a polymer.

The coupling PCB 180 can include at least one transmission line 185, depicted in FIG. 4B, to carry electrical excitation pulses provided by the pulse driver 150. The transmission line 185 can comprise two conductive traces running parallel to each other and separated by an insulating layer of the coupling PCB 180 (stacked one above the other in the plan view of FIG. 4B). The conductive traces of the transmission line 185 can connect to annular contacts 188 located on opposing surfaces of the coupling PCB 180 (also stacked one above the other in the drawing). However, contacts of shapes other than those shown in FIG. 4B can be used; in one example, respective annular contacts for corresponding conductors of the transmission line may be concentric with different diameters rather than stacked one above the other as shown in FIG. 4B. The annular contacts 188, or contacts of other shapes, can be located on the coupling PCB 180 for making electrical connections to the first collet 415 and the second collet 425.

Electrical connection between a first conductive trace of the transmission line 185 on a first side 182 of the coupling PCB 180 and the electrically-conductive layer 220 of the catalytic tube can be made with the first collet 415 and a first conductive sleeve 452. The first conductive sleeve 452 can be placed onto the catalytic tube 170 at a location where the electrically-conductive layer 220 is exposed (along length $L_1$, see FIG. 2A) and soldered or otherwise electrically connected to the electrically-conductive layer 220. The first conductive sleeve 452 can comprise a highly conductive metal such as copper, aluminum, gold, or an alloy or combination thereof. The first collet 415 can be placed over the first conductive sleeve 452. When the clamp 405 is tightened (by tightening screws 460, for example), drawing the first clamping plate 410 toward the second clamping plate 420, an end face 417 of the first collet 415 engages with a contact (e.g., annular contact 188) on the coupling PCB 180 making an electrical connection between the first conductive trace of the transmission line 185 and the first collet 415. The contact on the PCB can be annular in shape as shown in FIG. 4B or can be semi-annular in shape extending at least part way around the catalytic tube 170, for example. In some implementations, an area of the contact on the coupling PCB 180 is the same size as the end face 417 of the first collet 415 that comes into contact with the contact pad or electrical trace.

When the clamp 405 is tightened further, the first non-conducting clamping plate 410 squeezes the first collet 415 due to a mating conical hole 413 in the clamping plate 410. The conical hole 413 presses on the conical outer wall of the first collet 415 and tightens the first collet 415 onto the first conductive sleeve 452, making electrical connections between the first collet 415, the first conductive sleeve 452, and the electrically-conductive layer 220 on the catalytic tube 170. The taper angle $\alpha$ of the collet outer walls and mating conical holes in the electrical connector 400 can be between 5 degrees and 45 degrees, as measured between a line running along the outer angled wall of the collet (in the z direction) and a line running in the z direction along the inner wall of the collet (roughly indicated above the drawing of the electrical connector 400).

A similar assembly can be used to make electrical connection between a second conductive trace of the transmission line 185 on a second side 184 of the coupling PCB 180 and the reactive layer 240 on the catalytic tube 170 with the second clamping plate 420 and second collet 425. Tightening the screws 460 also pushes an end face 427 of the second collet 425 into electrical contact with the second trace on the second side 184 of the coupling PCB 180 and tightens the second collet 425 onto a second conductive sleeve 454 placed over the reactive layer 240.

The electrical connections via the collets and conductive sleeves to the ends of the transmission line 270 of the catalytic tube 170 can be very low impedance (e.g., from 0.001 mohm to 2 mohms) and the pair may be designed to match the RF impedance of the transmission line 270 of the catalytic tube 170, which can have a value in a range from 0.1 ohm to 75 ohms or from 0.1 ohm to 25 ohms in some cases. In one example implementation, the transmission line 270 has a characteristic impedance of approximately or equal to 10 ohms, more preferably approximately or equal to 5 ohms, and more preferably approximately or equal to 2 ohms. Additionally, transmission lines formed on the coupling PCB 180 can be designed to have an impedance that matches the impedance of the transmission line 270 of the catalytic tube 170. In this manner, catalytic tubes 170 can be electrically connected in series with matched impedances. As such, power reflections to the pulse driver 150 are reduced to levels that can be tolerated by electrical components in the pulse driver 150 and power coupling into the catalytic tubes 170 is increased. Further, fidelity and frequency content of the electrical excitation pulses can be maintained. A matched terminating impedance can be located at an end of the total electrical path after one or more connected catalytic tubes 170 to further prevent power reflections and pulse distortion.

According to some implementations, the first collet 415 is identical to the second collet 425 in size, shape, and dimensions. This can be possible even though the outer diameter of the catalytic tube 170 can be appreciably different where the two collets are located (see FIG. 2A). The first conductive sleeve 452 and the second conductive sleeve 454 can accommodate the differences in diameters. For example, both conductive sleeves can have the same outer diameter that fits within the two collets. The inner diameter of the first conductive sleeve 452 can be smaller than the inner diameter of the second conductive sleeve 454 to accommodate the differences in diameters of the catalytic tube 170 where the exposed electrically-conductive layer 220 is located along length $L_1$ and the exposed reactive layer 240 is located along length L2. In some implementations, the first collet 415, the second collet 425, the first conductive sleeve 452, and the second conductive sleeve 454 can be plated with a high conductor, such as gold or copper, to reduce contact resistance and provide better impedance matching. Further, the exposed portions of the electrically-conductive layer 220 and the reactive layer 240 can be plated with a high conductor, such as gold or copper.

The backing plate 430 can include one or more resilient contact elements for applying a resilient force against the second clamping plate 420. A resilient contact element can comprise at least one spring, at least one flexural tab, at least one wave washer, at least one piece of compliant material, etc. In the illustration of FIG. 4A, the resilient contact element comprises a wave washer 435 that can resiliently press against the second clamping plate 420 at three or more contact points. The resilient contact element can allow for expansion and contraction of the length and diameter of the catalytic tube 170 due to changes in operating temperatures while maintaining sufficient and nearly constant pressure on the first collet 415 and the second collet 425 to preserve the integrity of electrical connections to the electrically-conductive layer 220 and the reactive layer 240.

The clamp 405 may or may not include counter springs 440, which can be located anywhere between the first clamping plate 410 and PCB 180 and/or between the second clamping plate 420 and PCB 180. The counter springs 440 are arranged to push apart the first clamping plate 410 and the second clamping plate 420 away from the PCB 180 when screws 460 are loosened. The counter springs 440 can facilitate removal of the electrical connector 400 from the catalytic tube 170 (e.g., for replacement of the catalytic tube).

Although FIG. 4A illustrates only one electrical connector 400 for one catalytic tube 170, other configurations are possible. In some cases, the coupling PCB 180 can be large enough to extend across the ends of two or more catalytic tubes mounted in a heater 110. Transmission lines formed on the coupling PCB 180 can make electrical connections between different catalytic tubes 170. For example, the coupling PCB 180 can have transmission lines 154 (FIG. 1A) formed thereon to convey excitation pulses from the pulse driver 150 and from catalytic tube to catalytic tube. The PCB can connect catalytic tubes 170 in serial or in parallel. Parallel connections may require higher current output from the pulse driver 150 whereas serial connections may require higher voltage output from the current driver compared to a single catalytic tube. In some implementations, the first clamping plate 410, second clamping plate 420, and backing plate 430 can also extend across the ends of two or more catalytic tubes mounted in a heater 110. Extending the clamping plates and backing plate can reduce piece count, expedite assembly, and allow for a tighter packing of containment tubes 117 and catalytic tubes 170 in a heater at the cost of tighter alignment tolerances for distances between catalytic tube tubes. Having separate clamping plates and backing plates for each catalytic tube or subgroups of tubes may provide higher assurance of adequate electrical connections to the electrically-conductive layer 220 and the reactive layer 240 on each catalytic tube 170.

Figure 4C:
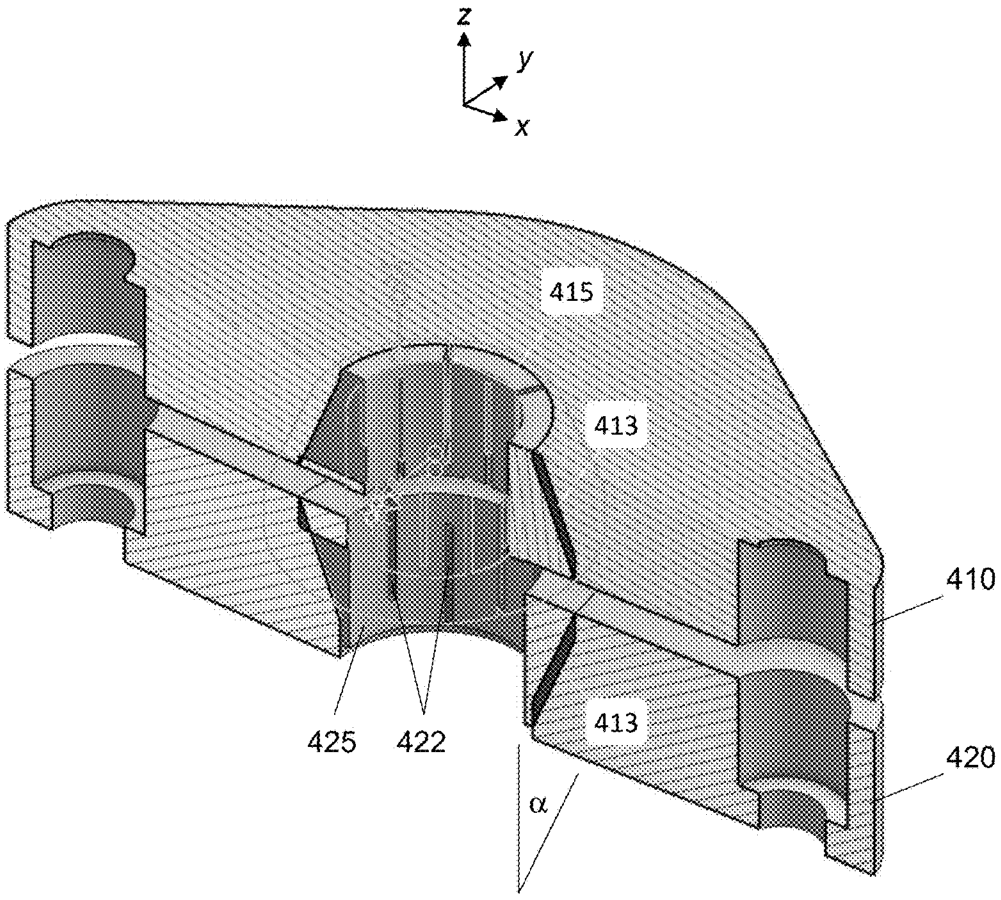
FIG. 4C illustrates further details of collets used in the electrical connector of FIG. 4A to make electrical connections to a transmission line formed on the catalytic tube.
Figure 4D:
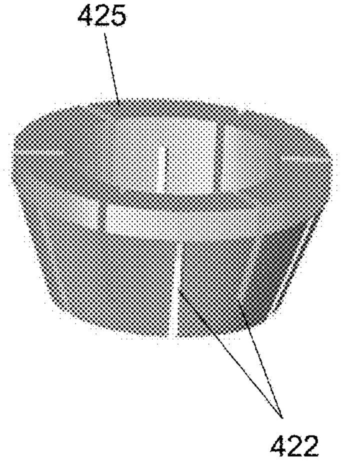
FIG. 4D is a cross-sectional, perspective view of a collet used in the electrical connector of FIG. 4A.

FIG. 4C illustrates, in a cross-sectional view, further details of the first collet 415 and the second collet 425 that are used to make electrical connections between transmission lines 185 on the coupling PCB 180 and the transmission line 270 of the catalytic tube 170 with the electrical connector 400 of FIG. 4A. FIG. 4D is a cross-section, perspective view of the second collet 425, which can be identical to the first collet 415, though different collets can be used in some cases. The first collet 415 and the second collet 425 each comprise longitudinal cuts 422 extending part way along the length of each collet. The longitudinal cuts 422 allow each collet to flex and its inner diameter to reduce when the conical outer wall of each collet is pressed on by the mating conical holes 413 in the first clamping plate 410 and the second clamping plate 420.

Figure 4E:
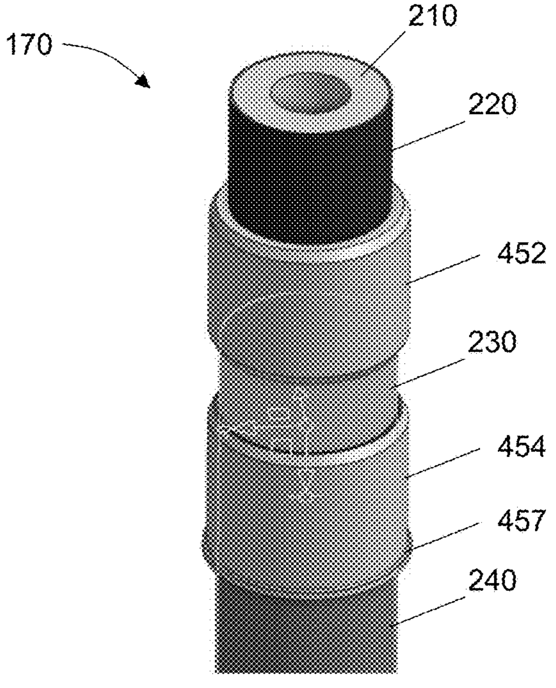
FIG. 4E depicts an end of a catalytic tube that can be inserted into the electrical connector of FIG. 4A.

FIG. 4E depicts an end of a catalytic tube 170 that can be inserted into the electrical connector 400 of FIG. 4A. The first conductive sleeve 452 and the second conductive sleeve 454 are placed over exposed regions of the electrically-conductive layer 220 and the reactive layer 240, respectively, on each catalytic tube 170. In some implementations, the second conductive sleeve 454 can include a flange 457 at one end to act as a stop for the second collet 425 when installing the clamping plates 410, 420 and coupling PCB 180.

In some implementations, one of the first collet 415 and second collet 425 may or may not include cuts for flexural purposes, may not have a conical shape, and a conductive sleeve may not be used. Instead, the first collet or second collet can have an end face 417 or 427 and be placed over and clamped to the exposed conductive layer. The collet may have one through-cut to allow expansion and compression of the collet ring, or the collet may be formed as two half pieces that can be clamped to either side of the catalytic tube 170. In some cases, the collet may be formed as multiple pieces that clamp to the catalytic tube 170. For easier implementation, the collet closer to the center of the catalytic tube (the second collet 425 in FIG. 4A) can be clamped to the tube. The electrical connector 400 can then include one clamping plate that only grasps the clamped collet and, for example, the first clamping plate 410 and first collet 415 as shown in FIG. 4A. When the first clamping plate 410 is drawn toward the clamping plate that grasps the clamped collet, the first clamping plate 410 will engage the first collet and draw it and the PCB 180 toward the clamped collet establishing electrical contact between the two collets and their respective annular contacts 188 on the PCB 180.

5. ADDITIONAL HEATER IMPLEMENTATIONS

Figure 5:
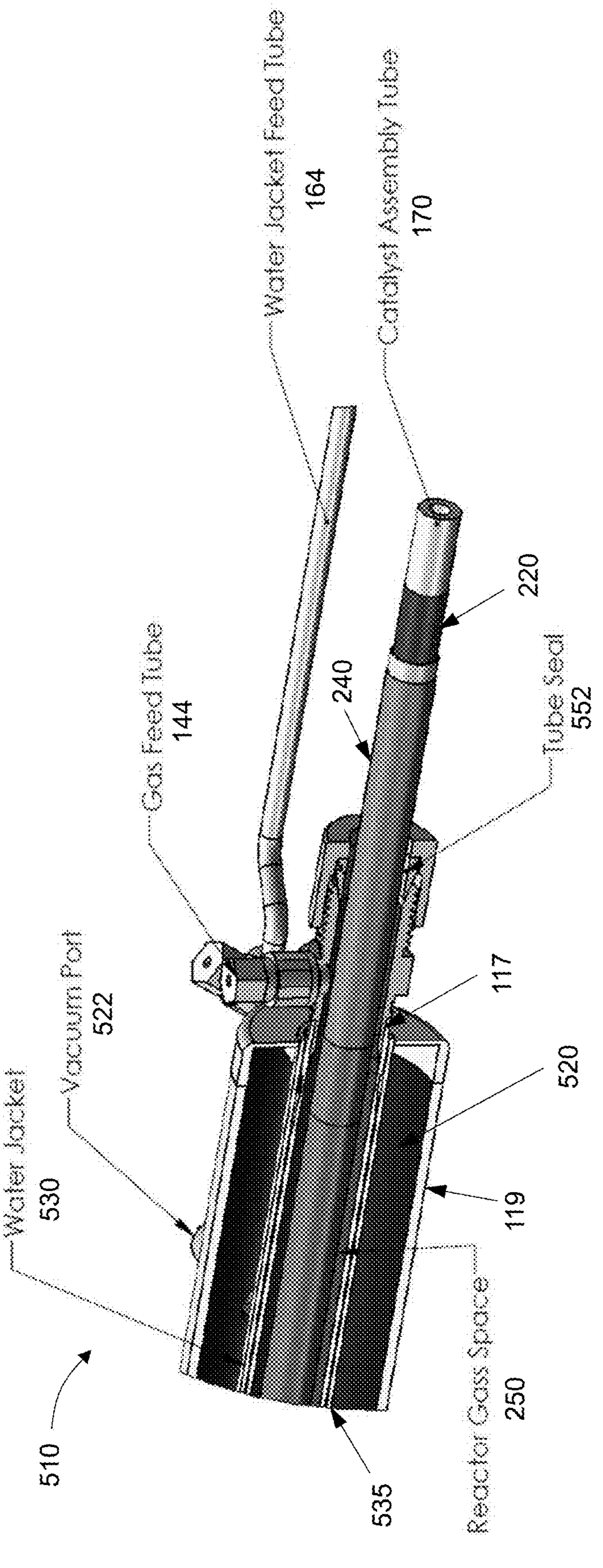
FIG. 5 illustrates another implementation of a heater that can be used in the heating system of FIG. 1A.

FIG. 5 depicts another implementation of a heater 510 that can be used in the heating system of FIG. 1A. The illustration is a cross-section that passes through the containment tube 117. Electrical connections to the catalytic tube 170 are not shown to simplify the drawing. The heater 510 shows only one containment tube 117 and catalytic tube 170 within the heater, but more containment tubes and catalytic tubes can be mounted within such a heater.

The heater 510 can be supplied with a reactant through a reactant input line 144 and supplied with a heat-transfer liquid or gas through a heat-transfer line 164. The reactant and heat-transfer gas or liquid can exit through a reactant output port and output heat-transfer port, respectively, at an opposite end of the heater 510. The heater 510 comprises a vacuum chamber 520 surrounding the containment tube 117 and a water jacket 530. Vacuum can be established within the vacuum chamber 520 through vacuum port 522. The vacuum chamber 520 can reduce heat transfer from the catalytic tube 170 to an external environment.

The heater 510 comprises an outer shell 119 containing a water jacket 530 surrounding the containment tube 117. The water jacket 530 comprises a jacket tube 535 having a larger inner diameter than the outer diameter of the containment tube 117 so that a sheath of heat-transfer fluid or gas can flow in a space between the containment tube 117 (from which heat is extracted) and the jacket tube 535. The jacket tube 535 can be part of the outer shell 119 which forms the vacuum chamber 520. Similar to the heater 110 of FIG. 1B and FIG. 3, the reactant can flow in a sheath along a reactant space 250 between an outer surface of the catalytic tube 170 and an inner surface of the containment tube 117. This reactant space 250 can be sealed at each end of the heater by a seal 552 (such as an O-ring).

For the heater designs of FIG. 2C and FIG. 5, the reactant space 250 can be packed with a material having high thermal conductivity (e.g., over 10 W $m^{-1}$ $K^{-1}$) and providing electrical isolation within the heater along an active length of the catalytic tube 170 where heat is generated. An example of a material having high thermal conductivity is alumina, which can also provide electrical isolation, though other electrically insulating materials having a high thermal conductivity may be used. To impede thermal conductivity near the ends of the catalytic tube 170, where the seal 552 and electrical connections are located, the reactant space can be packed with an electrically-insulating fill material that has a low thermal conductivity, such as silica, though other materials having a low thermal conductivity may be used.

6. DRIVE ELECTRONICS

Figure 6A:
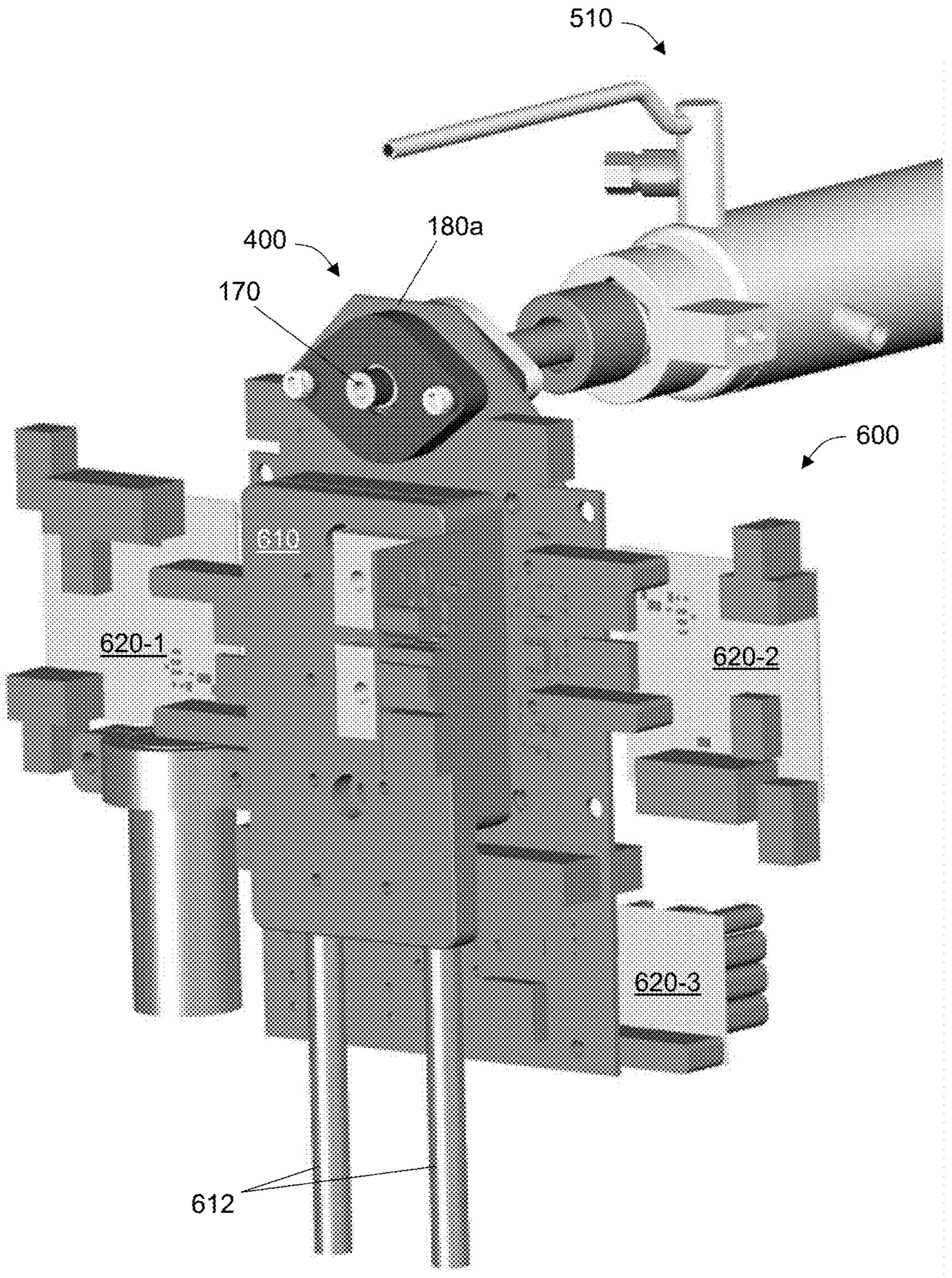
FIG. 6A depicts circuitry connected to a catalytic tube.
Figure 6B:
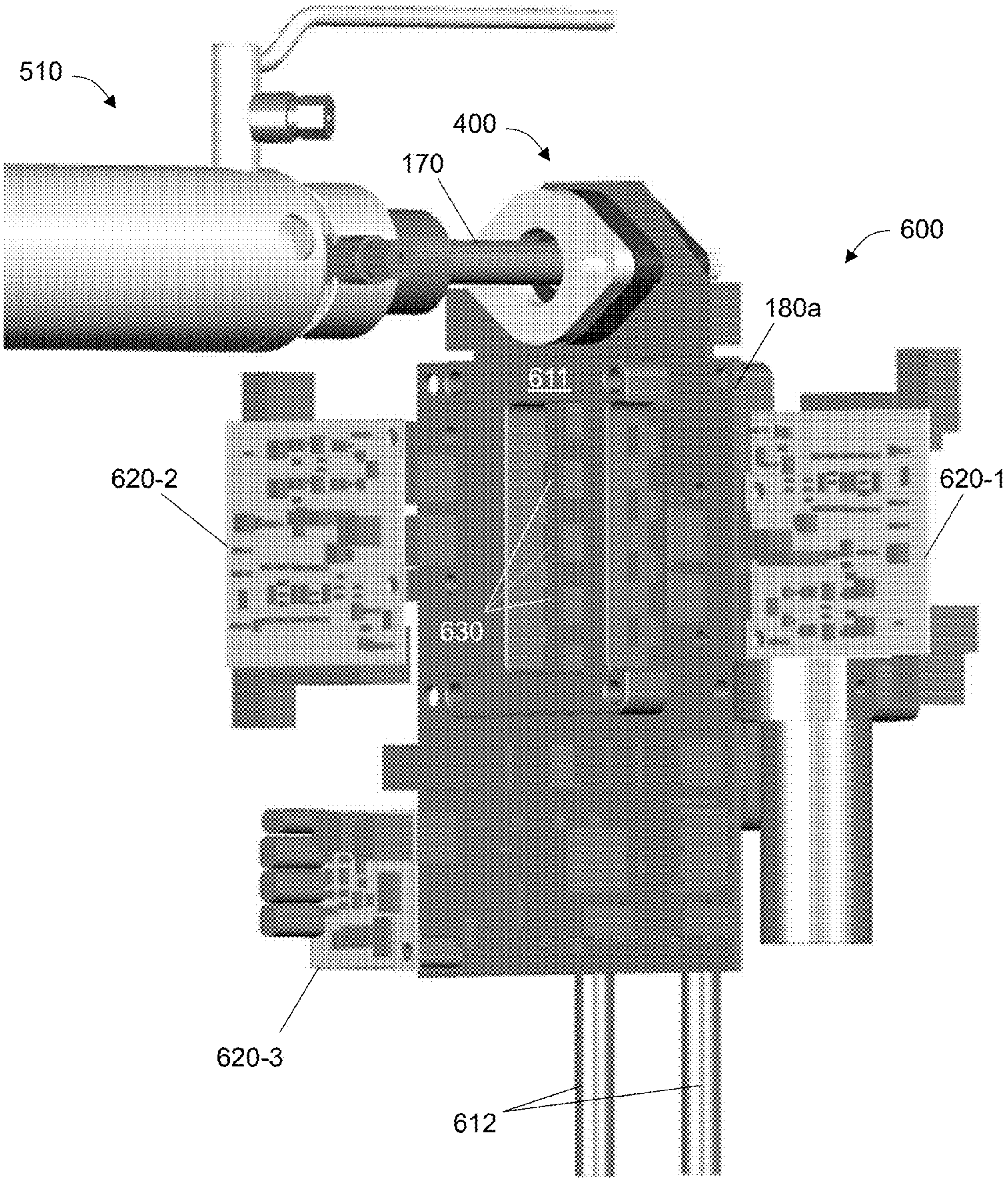
FIG. 6B depicts another view of the circuitry of FIG. 6A connected to the catalytic tube.

FIG. 6A and FIG. 6B depict an example implementation of drive electronics 600 used to transmit excitation pulses down the transmission line 270 of the catalytic tubes 170. The drive electronics 600 can comprise part or all of the pulse driver 150 discussed above in connection with FIG. 1A and other figures. In the illustrations, the drive electronics 600 are implemented on multiple printed circuit boards (e.g., the coupling PCB 180*a* and one or more auxiliary PCBs 620-1, 620-2, 620-3 that electrically couple to the coupling PCB 180*a*). Implementing at least some of the drive electronics 600 on the coupling PCB 180*a* can improve the quality of the excitation pulses delivered to the catalytic tube(s) 170. For example, shorter pulse rise times and/or durations may be possible compared to generating the excitation pulses with a remote electronic driver and transmitting the excitation pulses over lengthy transmission lines to the catalytic tube(s) 170.

In some implementations, the drive electronics 600 are configured to receive pulses from a pulse source (which can be located separately from the drive electronics) and adapt the received pulses for delivery as excitation pulses to the electrical connector 400 and transmission line 270 of the catalytic tube 170. Adaptation of the received pulses can comprise at least one of (1) preparing the excitation pulses to have a selected voltage amplitude, (2) providing sufficient current for each excitation pulse, (3) preparing the excitation pulses to have a selected pulse shape, and providing the excitation pulses over a transmission line that is impedance matched to the electrical connector 400 and transmission line 270.

In some implementations, the pulses received by the drive electronics 600 can be optical pulses. The optical pulses can be converted to electrical excitation pulses by the drive electronics 600 (with an opto-isolator, for example). Using such optical isolation can protect the pulse source from electromagnetic interference generated by the drive electronics 600 when outputting excitation pulses to the catalytic tube(s) 170.

The drive electronics 600 can comprise high-power, high-speed transistors 630 (such as gallium-nitride transistors) to perform voltage switching at moderate voltages (e.g., up to 100 volts) with high currents for generation of the excitation pulses. The transistors 630 (visible in FIG. 6B) can be mounted on the coupling PCB 180*a* in close proximity (e.g., within about 10 cm) to the location where the electrical connector 400 contacts the coupling PCB 180*a*. These transistors can generate significant heat during operation of the system. A heat sink 610 can be thermally coupled to the transistors 630 to aid in dissipating the heat generated by the transistors. The heat sink 610 can have a channel within it to flow a coolant through the heat sink. The coolant can be circulated through the heat sink with coolant lines 612. There can be a back plate 611 mounted to an opposite side of the coupling PCB 180*a* (visible in FIG. 6B) for additional cooling and to aid in connecting and thermally coupling the heat sink 610 to the coupling PCB 180*a*. The heat sink 610 and the back plate 611 can be made from a material having high thermal conductivity, such as copper or aluminum.

The opposite end of the catalytic tube 170 from the near end shown in FIG. 6A can connect to a different coupling PCB 180*b* (FIG. 1A) which may not include drive electronics 600. The coupling PCB 180*b* can include transmission lines to couple the distal end of a first catalytic tube 170 to the distal end of a second catalytic tube 170 at the same end of the heater 110. The coupling PCB 180*b* can also include probe points and may further include sensing electronics for detecting excitation pulses which have passed through a catalytic tube 170 (e.g., to check excitation pulse quality and evaluate tube performance). Output from the sensing electronics can be provided to the system controller 190 to monitor operation of the system. The system controller 190 can output a signal or shut down the system if the system controller 190 determines that system service is needed (e.g., detection of a faulty catalytic tube 170).

Each of the coupling PCBs 180*a*, 180*b* can include transmission lines patterned on the PCB to carry pulses to and from the transmission lines formed on the catalytic tubes 170. The transmission lines patterned on the coupling PCBs 180*a*, 180*b* can be engineered to have RF impedance values that match the RF impedance values of the transmission lines formed on the catalytic tubes 170. For example, the RF impedance values of the transmission lines patterned on the coupling PCBs 180*a*, 180*b* be within 10% of the RF impedance values of the transmission lines formed on the catalytic tubes 170 over a range of frequencies from approximately or exactly 250 MHz to 2 GHz, impedance matching over other frequency ranges is possible.

7. CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that inventive embodiments may be practiced otherwise than as specifically described. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

Unless stated otherwise, the terms "approximately" and "about" are used to mean within ±20% of a target (e.g., dimension or orientation) in some embodiments, within ±10% of a target in some embodiments, within ±5% of a target in some embodiments, and yet within ±2% of a target in some embodiments. The terms "approximately" and "about" can include the target. The term "essentially" is used to mean within ±3% of a target.

The indefinite articles "a" and "an," as used herein, unless clearly indicated to the contrary, should be understood to mean "at least one."

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," shall have its ordinary meaning as used in the field of patent law.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A heating system comprising:

a heater comprising:

an outer shell enclosing a heater chamber to contain a heat-transfer liquid or gas;

a first containment tube extending through the heater chamber and extending outside of the outer shell, the first containment tube sealed to prevent ingress of the heat-transfer liquid or gas into the first containment tube; and a first catalytic tube to generate heat, the first catalytic tube mounted within the first containment tube, the first catalytic tube comprising:

an electrically-conductive layer extending along the first catalytic tube;

an insulating layer disposed on the electrically-conductive layer; and an electrically-conductive reactive layer disposed on the insulating layer, wherein the electrically-conductive layer, the insulating layer, and the electrically-conductive reactive layer form a first transmission line that extends along the first catalytic tube, wherein the first containment tube contacts the heat-transfer liquid or gas when the heater is in operation to thermally couple heat from the first catalytic tube to the heat-transfer liquid or gas when contained in the heater chamber;

a pulse driver adapted to provide electrical pulses to propagate along the first transmission line of the first catalytic tube to generate heat from the first catalytic tube; and an electrical connector to electrically connect to the first transmission line of the first catalytic tube, wherein the electrical connector comprises:

a first clamping plate to engage a first collet, wherein the first clamping plate and the first collet can be placed over an end of the first catalytic tube; and a second clamping plate to engage a second collet, wherein the second clamping plate and the second collet can be placed over the end of the first catalytic tube.

2. The heating system of claim 1, wherein a first impedance of the first transmission line of the first catalytic tube is in a range from 0.1 ohm to 25 ohms.

3. The heating system of claim 2, wherein the first impedance of the first transmission line of the first catalytic tube is approximately or equal to 2 ohms.

4. A heating system comprising:

a heater comprising:

an outer shell enclosing a heater chamber to contain a heat-transfer liquid or gas;

a first containment tube extending through the heater chamber and through the outer shell, the first containment tube sealed to prevent ingress of the heat-transfer liquid or gas into the first containment tube; and a first catalytic tube to generate heat, the first catalytic tube mounted within the first containment tube, the first catalytic tube comprising:

an electrically-conductive layer extending along the first catalytic tube;

an insulating layer disposed on the electrically-conductive layer; and an electrically-conductive reactive layer disposed on the insulating layer, wherein the electrically-conductive layer, the insulating layer, and the electrically-conductive reactive layer form a first transmission line that extends along the first catalytic tube, wherein the first containment tube contacts the heat-transfer liquid or gas when the heater is in operation to thermally couple heat from the first catalytic tube to the heat-transfer liquid or gas when contained in the heater chamber;

a pulse driver adapted to provide electrical pulses to propagate along the first transmission line of the first catalytic tube to generate heat from the first catalytic tube; and an electrical connector to electrically connect to the first transmission line of the first catalytic tube, wherein a first impedance of the first transmission line of the first catalytic tube is in a range from 0.1 ohm to 25 ohms; and wherein:

the pulse driver includes drive electronics implemented at least in part on at least one printed circuit board (PCB); and the at least one printed circuit board includes at least one PCB transmission line patterned on the at least one PCB to carry the electrical pulses provided by the pulse driver.

5. The heating system of claim 4, wherein the at least one PCB transmission line is impedance-matched to the first transmission line of the first catalytic tube.

6. The heating system of claim 5, wherein a second impedance of the at least one PCB transmission line is within 10% of the first impedance of the first transmission line over a range of frequencies from approximately or exactly 250 MHz to approximately or exactly 2 GHz.

7. The heating system of claim 4, wherein:

the drive electronics are configured to receive optical pulses; and the drive electronics are configured to convert the received optical pulses to provide the electrical pulses from the pulse driver to propagate along the first transmission line of the first catalytic tube.

8. The heating system of claim 4, wherein the electrical connector comprises:

a first clamping plate to engage a first collet, wherein the first clamping plate and the first collet can be placed over an end of the first catalytic tube; and a second clamping plate to engage a second collet, wherein the second clamping plate and the second collet can be placed over the end of the first catalytic tube, wherein the first collet and the second collet facilitate an electrical connection between the at least one PCB transmission line patterned on the at least one PCB and the first transmission line of the first catalytic tube.

9. The heating system of claim 8, wherein:

the at least one printed circuit board of the drive electronics includes:

a first annular contact disposed on a first side of the at least one printed circuit board; and a second annular contact disposed on a second side of the at least one printed circuit board;

the first annular contact and the second annular contact are coupled to the at least one PCB transmission line; and the first collet is electrically coupled to the first annular contact by the first clamping plate and the second collet is electrically coupled to the second annular contact by the second clamping plate to facilitate the electrical connection between the at least one PCB transmission line and the first transmission line of the first catalytic tube.

10. A heater comprising:

an outer shell enclosing a heater chamber to contain a heat-transfer liquid or gas;

a first containment tube extending through the heater chamber and extending outside of the outer shell, the first containment tube sealed to prevent ingress of the heat-transfer liquid or gas into the first containment tube;

a first catalytic tube to generate heat, the first catalytic tube mounted within the first containment tube, the first catalytic tube comprising a first transmission line that extends along the first catalytic tube;

a second containment tube extending through the heater chamber and through the outer shell;

a second catalytic tube mounted within the second containment tube; and a manifold to receive the reactant and supply the reactant into a first interior of the first containment tube and a second interior of the second containment tube, wherein:

the first containment tube contacts the heat-transfer liquid or gas when the heater is in operation to thermally couple heat from the first catalytic tube to the heat-transfer liquid or gas when contained in the heater chamber; and an outer diameter of the first catalytic tube is smaller than an inner diameter of the first containment tube so as to form a first reactant space in the first interior between an outer surface of the first catalytic tube and an inner surface of the first containment tube, such that a reactant, when present in the heater, flows through the first reactant space.

11. The heater of claim 10, wherein:

the first containment tube comprises:

a tubular portion;

a first insert to insert into a first end of the tubular portion; and a second insert to insert into a second end of the tubular portion, wherein the first insert and the second insert are configured to support the first catalytic tube within the first containment tube.

12. The heater of claim 11, wherein the first insert and the second insert each comprise:

a ferule; and a nut to engage the ferule to support the first catalytic tube within the first containment tube.

13. The heater of claim 10, further comprising a porous, electrically insulating, and thermally-conductive fill within the first reactant space.

14. The heater of claim 10, wherein:

the manifold includes a chamber and is integrated onto an end of the heater such that each of the first containment tube and the second containment tube passes through the manifold; and each of the first containment tube and the second containment tube includes a hole located within the chamber of the manifold to admit the reactant, when present, into the first interior of the first containment tube and the second interior of the second containment tube.

15. The heater of claim 10, in combination with a pulse driver adapted to provide electrical pulses to propagate along the first transmission line of the first catalytic tube to generate heat from the first catalytic tube.

16. The heater of claim 10, further comprising an electrical connector to electrically connect to the first transmission line of the first catalytic tube.

17. A heating system comprising:

a heater comprising:

an outer shell enclosing a heater chamber to contain a heat-transfer liquid or gas;

a first containment tube extending through the heater chamber and through the outer shell, the first containment tube sealed to prevent ingress of the heat-transfer liquid or gas into the first containment tube, wherein the first containment tube comprises:

a tubular portion;

a first insert to insert into a first end of the tubular portion; and a second insert to insert into a second end of the tubular portion, wherein the first insert and the second insert are configured to support the first catalytic tube within the first containment tube; and a first catalytic tube to generate heat, the first catalytic tube mounted within the first containment tube, the first catalytic tube comprising a first transmission line that extends along the first catalytic tube, wherein the first containment tube contacts the heat-transfer liquid or gas when the heater is in operation to thermally couple heat from the first catalytic tube to the heat-transfer liquid or gas when contained in the heater chamber;

a pulse driver adapted to provide electrical pulses to propagate along the first transmission line of the first catalytic tube to generate heat from the first catalytic tube, wherein:

the pulse driver includes drive electronics implemented at least in part on at least one printed circuit board (PCB); and the at least one printed circuit board includes at least one PCB transmission line patterned on the at least one PCB to carry the electrical pulses provided by the pulse driver; and an electrical connector to electrically connect to the first transmission line of the first catalytic tube, the electrical connector including a first collet and a second collet to facilitate an electrical connection between the at least one PCB transmission line patterned on the at least one PCB and the first transmission line of the first catalytic tube.

18. The heating system of claim 17, wherein a first impedance of the first transmission line of the first catalytic tube is in a range from 0.1 ohm to 25 ohms.

19. The heating system of claim 18, wherein the at least one PCB transmission line is impedance-matched to the first transmission line of the first catalytic tube.

20. The heating system of claim 19, wherein the electrical connector comprises:

a first clamping plate to engage the first collet, wherein the first clamping plate and the first collet can be placed over an end of the first catalytic tube; and a second clamping plate to engage the second collet, wherein the second clamping plate and the second collet can be placed over the end of the first catalytic tube.

21. A heater for a heating system, the heater comprising:

an outer shell enclosing a heater chamber to contain a heat-transfer liquid or gas;

a first containment tube extending through the heater chamber and extending outside of the outer shell, the first containment tube sealed to prevent ingress of the heat-transfer liquid or gas into the first containment tube; and a first catalytic tube to generate heat, the first catalytic tube mounted within the first containment tube, the first catalytic tube comprising multiple coaxial layers forming a first transmission line that extends along the first catalytic tube, wherein:

a first impedance of the first transmission line of the first catalytic tube is a value in a range from 0.1 ohm to 25 ohms, and the multiple coaxial layers comprise:

an electrically-conductive layer extending along the first catalytic tube;

an insulating layer disposed on the electrically-conductive layer; and an electrically-conductive reactive layer disposed on the insulating layer, wherein the first containment tube contacts the heat-transfer liquid or gas when the heater is in operation to thermally couple heat from the first catalytic tube to the heat-transfer liquid or gas when contained in the heater chamber.

22. The heater of claim 21, in combination with a pulse driver adapted to provide electrical pulses to propagate along the first transmission line of the first catalytic tube to generate heat from the first catalytic tube.

23. The heater of claim 21, in combination with an electrical connector to electrically connect to the first transmission line of the first catalytic tube.

24. The heater of claim 21, further comprising:

a second containment tube extending through the heater chamber and through the outer shell; and a second catalytic tube mounted within the second containment tube, the second catalytic tube comprising multiple coaxial layers forming a second transmission line that extends along the second catalytic tube, wherein a second impedance of the second transmission line of the second catalytic tube is a value in a range from 0.1 ohm to 25 ohms, wherein the second containment tube contacts the heat-transfer liquid or gas when the heater is in operation to thermally couple second heat from the second catalytic tube to the heat-transfer liquid or gas when contained in the heater chamber.

25. The heater of claim 24, further comprising:

a manifold to receive the reactant and supply the reactant into a first interior of the first containment tube and a second interior of the second containment tube.

26. The heater of claim 25, wherein:

the manifold includes a chamber and is integrated onto an end of the heater such that each of the first containment tube and the second containment tube passes through the manifold; and each of the first containment tube and the second containment tube includes a hole located within the chamber of the manifold to admit the reactant, when present, into the first interior of the first containment tube and the second interior of the second containment tube.

27. A heater for a heating system, the heater comprising:

an outer shell enclosing a heater chamber to contain a heat-transfer liquid or gas;

a first containment tube extending through the heater chamber and through the outer shell, the first containment tube sealed to prevent ingress of the heat-transfer liquid or gas into the first containment tube;

a first catalytic tube to generate heat, the first catalytic tube mounted within the first containment tube, the first catalytic tube comprising multiple coaxial layers forming a first transmission line that extends along the first catalytic tube; and an electrical connector to electrically connect to the first transmission line of the first catalytic tube, the electrical connector including at least a first collet to facilitate an electrical connection to the first transmission line, wherein the first containment tube contacts the heat-transfer liquid or gas when the heater is in operation to thermally couple heat from the first catalytic tube to the heat-transfer liquid or gas when contained in the heater chamber, wherein the multiple coaxial layers comprise:

an electrically-conductive layer extending along the first catalytic tube;

an insulating layer disposed on the electrically-conductive layer; and an electrically-conductive reactive layer disposed on the insulating layer.

28. The heater of claim 27, wherein:

the first catalytic tube further comprises a cylindrical support, wherein the cylindrical support comprises one of a metal, a ceramic, and a glass; and the electrically-conductive reactive layer is disposed relative to an outside surface of the cylindrical support.

29. The heater of claim 27, wherein:

the electrically-conductive layer comprises at least one of copper or aluminum;

the insulating layer comprises alumina; and the electrically-conductive reactive layer comprises at least one of nickel, grainy nickel, copper, palladium, platinum, rhodium, titanium, tungsten, cobalt, or iron.

30. The heater of claim 29, wherein:

the electrically-conductive layer has a first thickness of between 1 micron and 500 microns;

the insulating layer has a second thickness of between 100 microns and 400 microns; and the electrically-conductive reactive layer has a third thickness of between 200 microns and 900 microns.

* * * * *